(12) United States Patent
Horie et al.

(10) Patent No.: US 9,778,123 B2
(45) Date of Patent: Oct. 3, 2017

(54) POSITION INDICATOR

(71) Applicant: Wacom Co., Ltd., Saitama (JP)

(72) Inventors: Toshihiko Horie, Saitama (JP);
Hidetaka Takiguchi, Saitama (JP)

(73) Assignee: Wacom Co., Ltd., Saitama (JP)

(*) Notice: Subject to any disclaimer, the term of this patent is extended or adjusted under 35 U.S.C. 154(b) by 0 days.

(21) Appl. No.: 15/060,403

(22) Filed: Mar. 3, 2016

(65) Prior Publication Data
US 2016/0188008 A1    Jun. 30, 2016

Related U.S. Application Data

(63) Continuation of application No. 14/714,064, filed on May 15, 2015, which is a continuation of application
(Continued)

(30) Foreign Application Priority Data

Feb. 6, 2012  (JP) .................. 2012-023530

(51) Int. Cl.
*G01L 9/00*       (2006.01)
*G06F 3/0354*  (2013.01)
(Continued)

(52) U.S. Cl.
CPC .......... *G01L 9/0073* (2013.01); *G01D 5/2046* (2013.01); *G01L 1/142* (2013.01);
(Continued)

(58) Field of Classification Search
CPC ................................................. G01L 9/0073
(Continued)

(56) References Cited

U.S. PATENT DOCUMENTS 5,206,785 A * 4/1993 Hukashima .......... G01D 5/2417
361/283.2
5,438,275 A    8/1995 Fado et al.
(Continued)

FOREIGN PATENT DOCUMENTS

CN      101727218 A    6/2010
CN      102254681 A    11/2011
(Continued)

OTHER PUBLICATIONS

Japanese Office Action dated Jan. 13, 2016, for corresponding JP Application No. 2012-015254, 7 pages.
(Continued)

*Primary Examiner* — Lisa Caputo
*Assistant Examiner* — Jamel Williams
(74) *Attorney, Agent, or Firm* — Seed Intellectual Property Law Group LLP

(57) ABSTRACT

A position indicator includes a capacitor having a capacitance that changes in correspondence to a force applied to one end part of a housing. The capacitor is configured by a pressure detecting chip that includes a first electrode and a second electrode disposed opposite to the first electrode with a predetermined distance defined therebetween to have capacitance Cv formed between the first electrode and the second electrode. The capacitance Cv changes when the force applied to the one end part of the housing is transmitted to the first electrode to thereby change a relationship (e.g., the distance) between the two electrodes. A pressure transmitting member having predetermined elasticity is disposed on the first electrode such that the force applied to the one end part of the housing is transmitted to the first electrode of the semiconductor element via the pressure transmitting member.

17 Claims, 16 Drawing Sheets

Related U.S. Application Data

No. 13/738,813, filed on Jan. 10, 2013, now Pat. No. 9,063,025.

(51) Int. Cl.
*G01L 1/14* (2006.01)
*G01D 5/20* (2006.01)
*G06F 3/044* (2006.01)
*G06F 3/038* (2013.01)
*H01G 5/14* (2006.01)

(52) U.S. Cl.
CPC ........ *G06F 3/0383* (2013.01); *G06F 3/03545* (2013.01); *G06F 3/044* (2013.01); *H01G 5/14* (2013.01)

(58) Field of Classification Search
USPC .................................................. 324/207.17
See application file for complete search history.

(56) References Cited

U.S. PATENT DOCUMENTS

| | | | |
|---|---|---|---|
| 6,167,761 B1 | 1/2001 | Hanzawa et al. | |
| 6,328,696 B1 | 12/2001 | Fraser | |
| 6,564,643 B1 | 5/2003 | Horie et al. | |
| 6,853,369 B2 | 2/2005 | Fukushima et al. | |
| 6,952,201 B2 | 10/2005 | Fukushima et al. | |
| 7,325,457 B2 | 2/2008 | Fujimori et al. | |
| 8,525,530 B2 | 9/2013 | Fukushima et al. | |
| 8,674,967 B2 | 3/2014 | Fukushima et al. | |
| 8,823,114 B2 | 9/2014 | Tanaka et al. | |
| 9,239,639 B1* | 1/2016 | Vanderet | G06F 3/03545 |
| 9,269,488 B2* | 2/2016 | Obata | G06F 3/03545 |
| 9,297,633 B2 | 3/2016 | Obata | |
| 2001/0038384 A1* | 11/2001 | Fukushima | G06F 3/03545 345/179 |
| 2002/0194919 A1 | 12/2002 | Lee et al. | |
| 2003/0081369 A1 | 5/2003 | Haag et al. | |
| 2003/0156743 A1 | 8/2003 | Okada et al. | |
| 2003/0157472 A1* | 8/2003 | Castillo | B43L 1/008 434/409 |
| 2004/0144575 A1* | 7/2004 | Zloter | G06F 3/03545 178/19.02 |
| 2004/0246230 A1 | 12/2004 | Oda et al. | |
| 2005/0104865 A1 | 5/2005 | Oda et al. | |
| 2005/0132814 A1 | 6/2005 | Satou et al. | |
| 2007/0068266 A1 | 3/2007 | Fujimori et al. | |
| 2007/0262401 A1 | 11/2007 | Yokoyama et al. | |
| 2008/0180092 A1* | 7/2008 | Fukushima | G01D 5/208 324/207.16 |
| 2008/0257613 A1* | 10/2008 | Katsurahira | G06F 3/03545 178/19.04 |
| 2009/0114459 A1* | 5/2009 | Fukushima | G06F 3/03545 178/19.03 |
| 2009/0160790 A1 | 6/2009 | Fukushima et al. | |
| 2010/0038152 A1* | 2/2010 | Kaneda | G06F 3/03545 178/18.07 |
| 2011/0241703 A1 | 10/2011 | Fukushima et al. | |
| 2011/0291999 A1* | 12/2011 | Liang | B43K 23/06 345/179 |
| 2011/0298709 A1* | 12/2011 | Vaganov | G06F 3/03546 345/158 |
| 2012/0010538 A1 | 1/2012 | Dirksen | |
| 2012/0199921 A1 | 8/2012 | Tanaka et al. | |
| 2012/0228109 A1 | 9/2012 | Wang et al. | |
| 2013/0193532 A1 | 8/2013 | Horie et al. | |
| 2014/0009863 A1 | 1/2014 | Obata | |
| 2014/0069532 A1* | 3/2014 | Obata | G06F 3/046 137/554 |
| 2015/0145074 A1 | 5/2015 | Kolb et al. | |

FOREIGN PATENT DOCUMENTS

| | | | |
|---|---|---|---|
| EP | 2 395 524 A1 | 12/2011 | |
| EP | 2 624 104 A2 | 8/2013 | |
| JP | 60-92670 A | 5/1985 | |
| JP | 62-271124 A | 11/1987 | |
| JP | 62271124 A * | 11/1987 | |
| JP | 04-96212 A | 3/1992 | |
| JP | 05-275283 A | 10/1993 | |
| JP | 6-37924 U | 5/1994 | |
| JP | 11-132872 A | 5/1999 | |
| JP | 11-284204 A | 10/1999 | |
| JP | 2001-83030 A | 3/2001 | |
| JP | 2004-309282 A | 11/2004 | |
| JP | 2005-19583 A | 1/2005 | |
| JP | 2005-24480 A | 1/2005 | |
| JP | 2007-086002 A | 4/2007 | |
| JP | 2007-101222 A | 4/2007 | |
| JP | 2011-216512 A | 10/2011 | |
| JP | EP 2395524 A1 * | 12/2011 | .............. H01G 5/16 |
| TW | 200907774 A | 2/2009 | |
| WO | 2007/015218 A2 | 2/2007 | |
| WO | 2011/045836 A1 | 4/2011 | |
| WO | 2015/098486 A1 | 7/2015 | |

OTHER PUBLICATIONS

Japanese Office Action dated Dec. 9, 2015, for corresponding JP Application No. 2012-023530, 2 pages.
Extended European Search Report, dated Feb. 19, 2016, for EP Application No. 13153205.3-1972 / 2624104, 10 pages.
Extended European Search Report dated Jun. 3, 2016, for corresponding EP Application No. 13152613.9-1557, 7 pages.
Taiwanese Office Action dated Jun. 17, 2016, for corresponding TW Application No. 102101768, 34 pages.
Non-Final Office Action, dated Nov. 17, 2016, for corresponding U.S. Appl. No. 14/714,064, 19 pages.

* cited by examiner

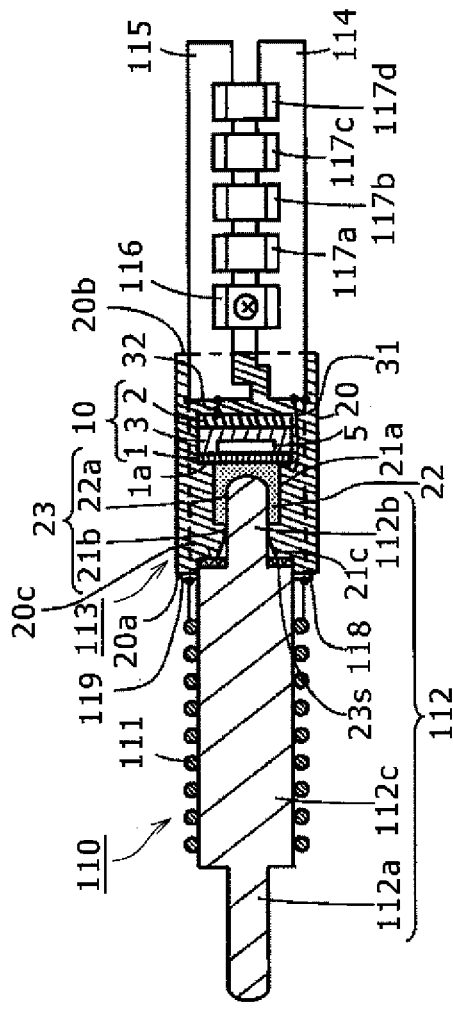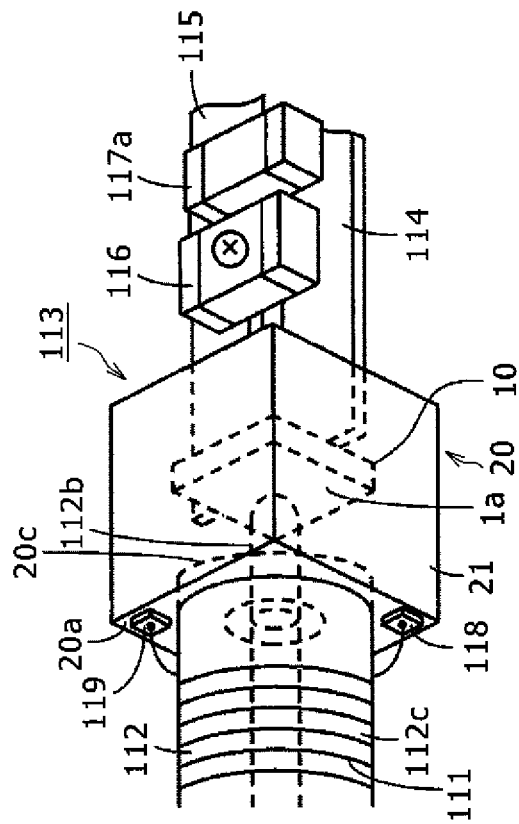
FIG.3A
FIG.3B

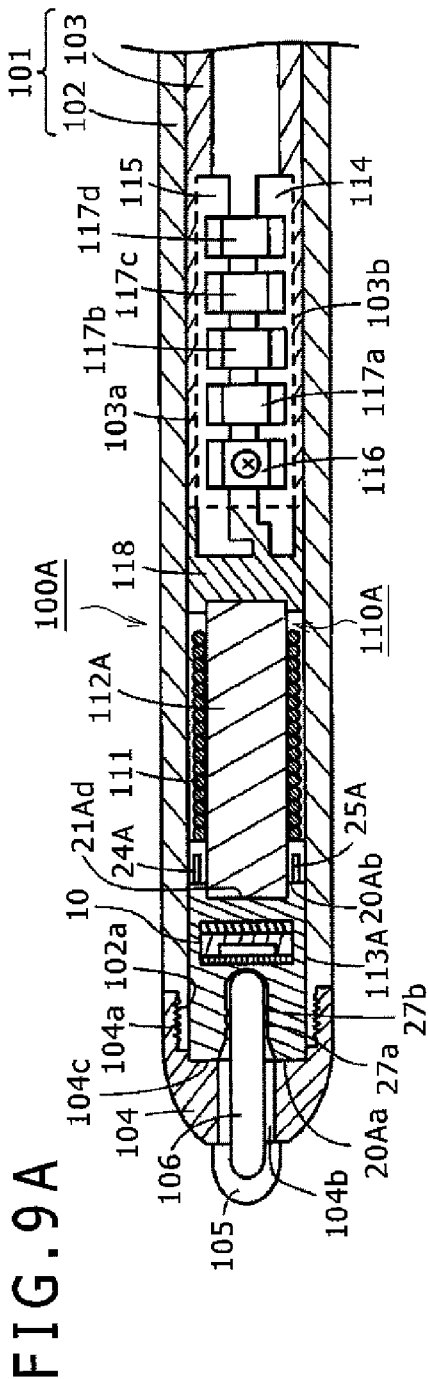
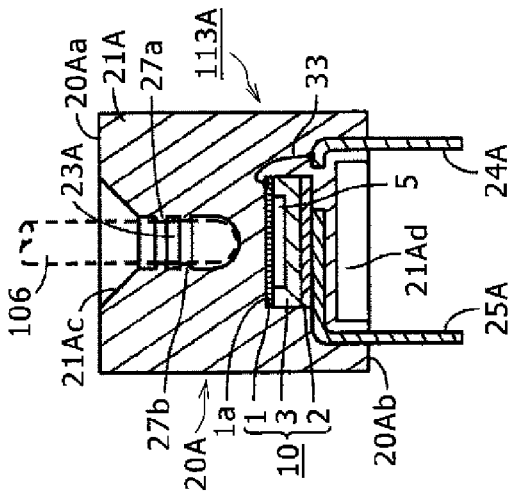
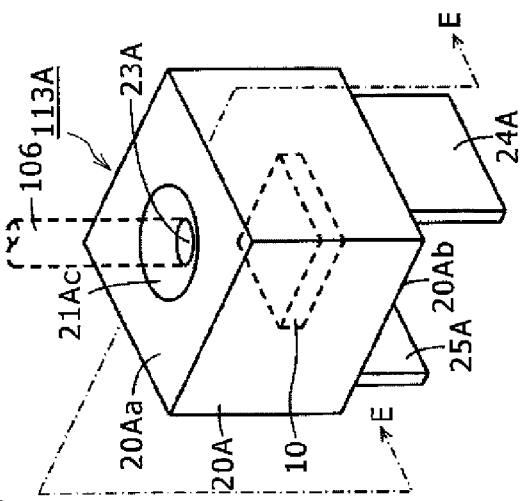
FIG. 9A
FIG. 9B
FIG. 9C

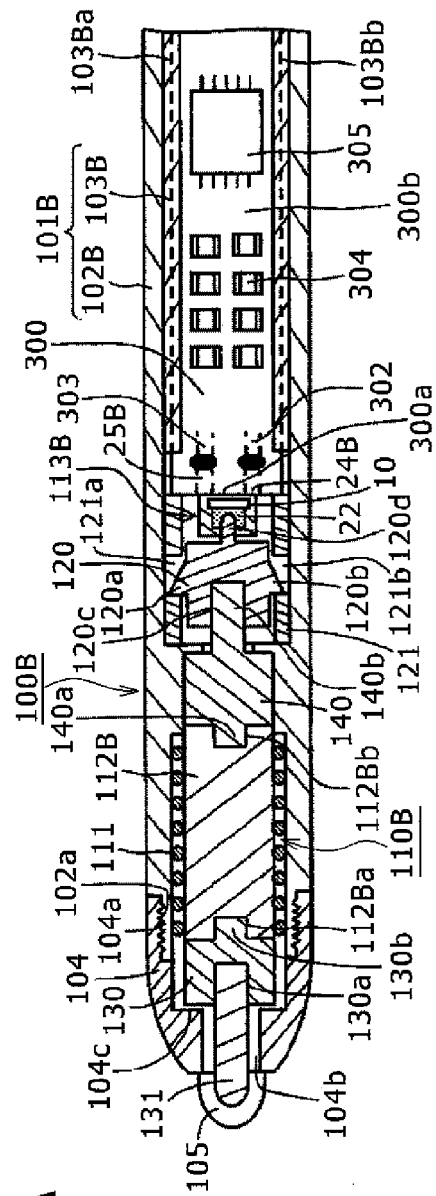
FIG.10A
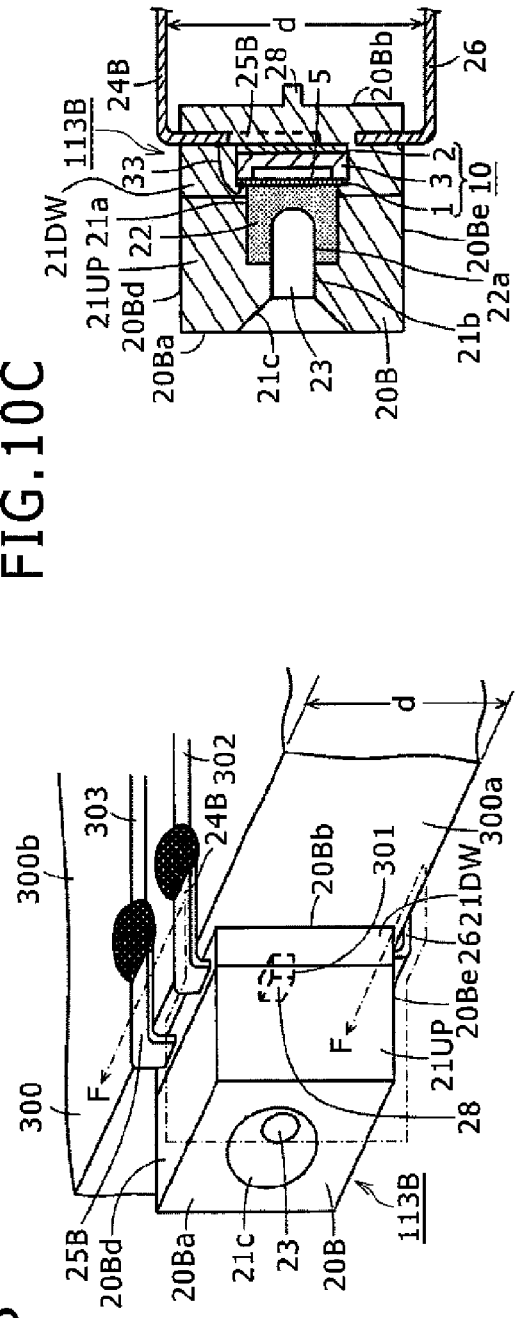
FIG.10B
FIG.10C

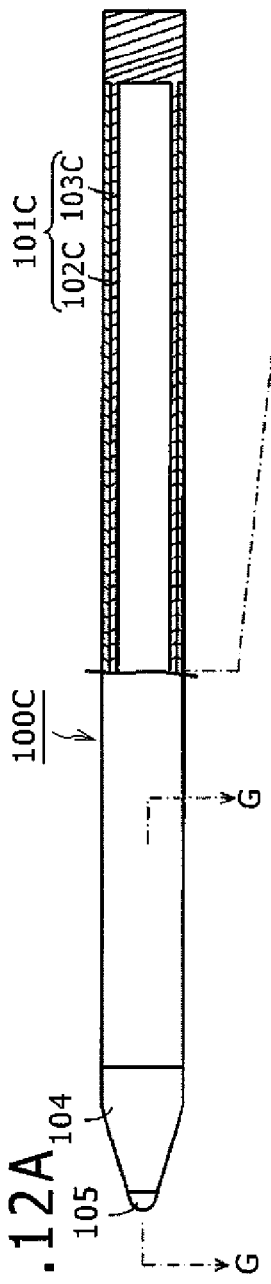
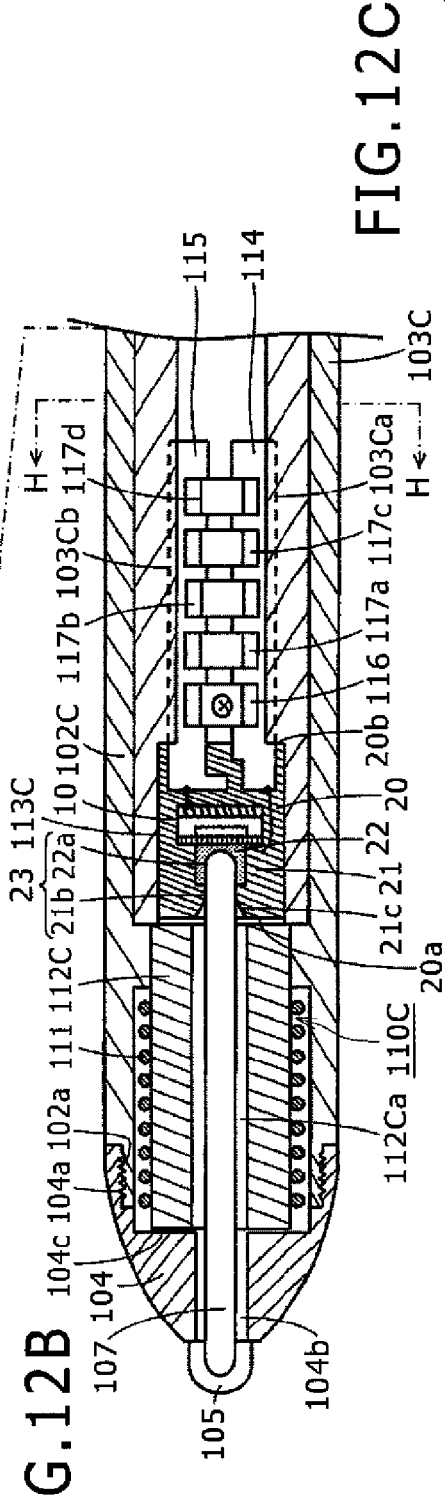
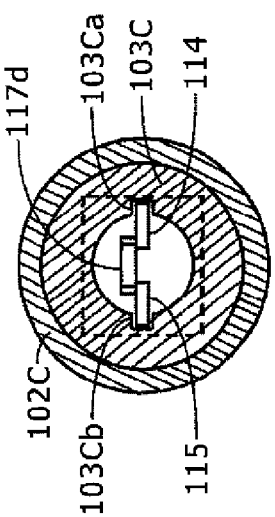
FIG.12A
FIG.12B
FIG.12C

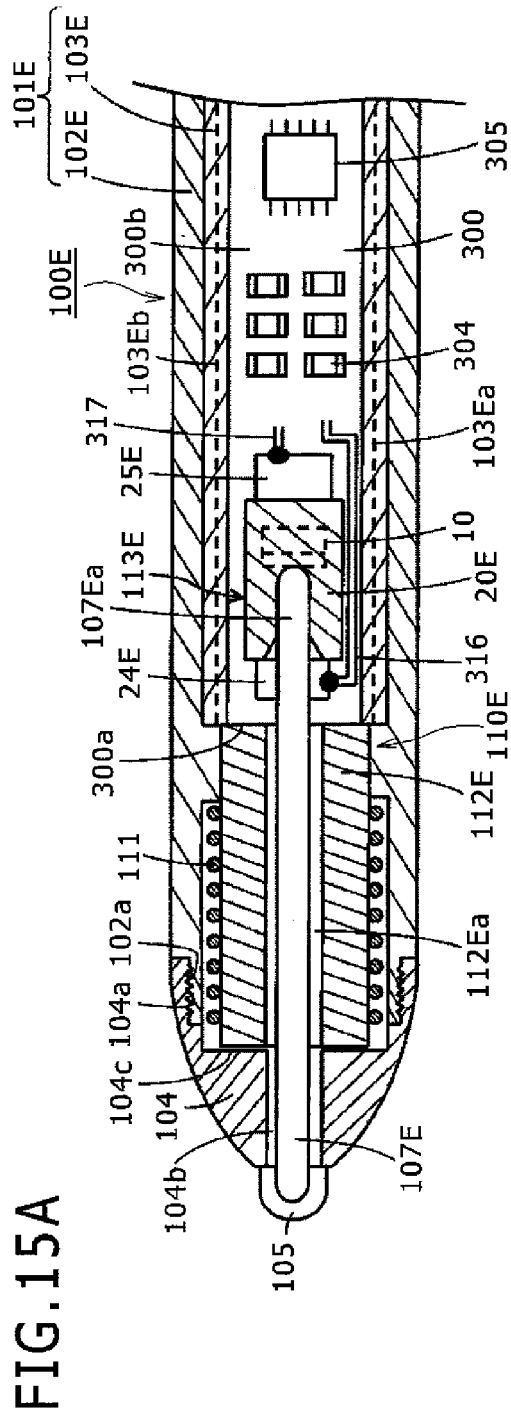
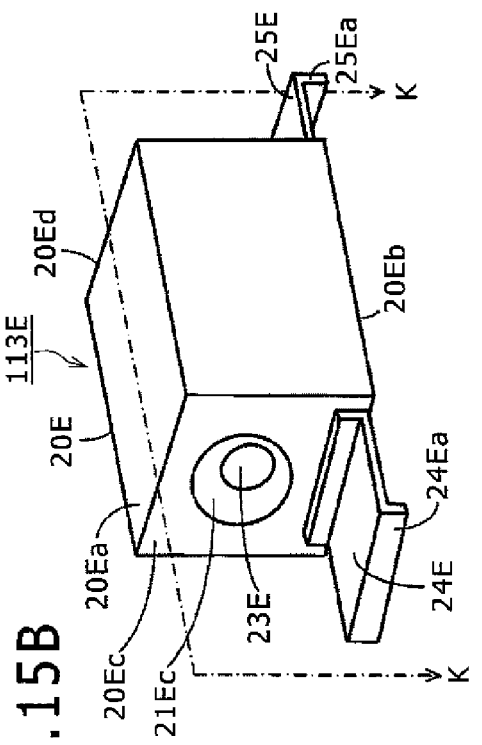
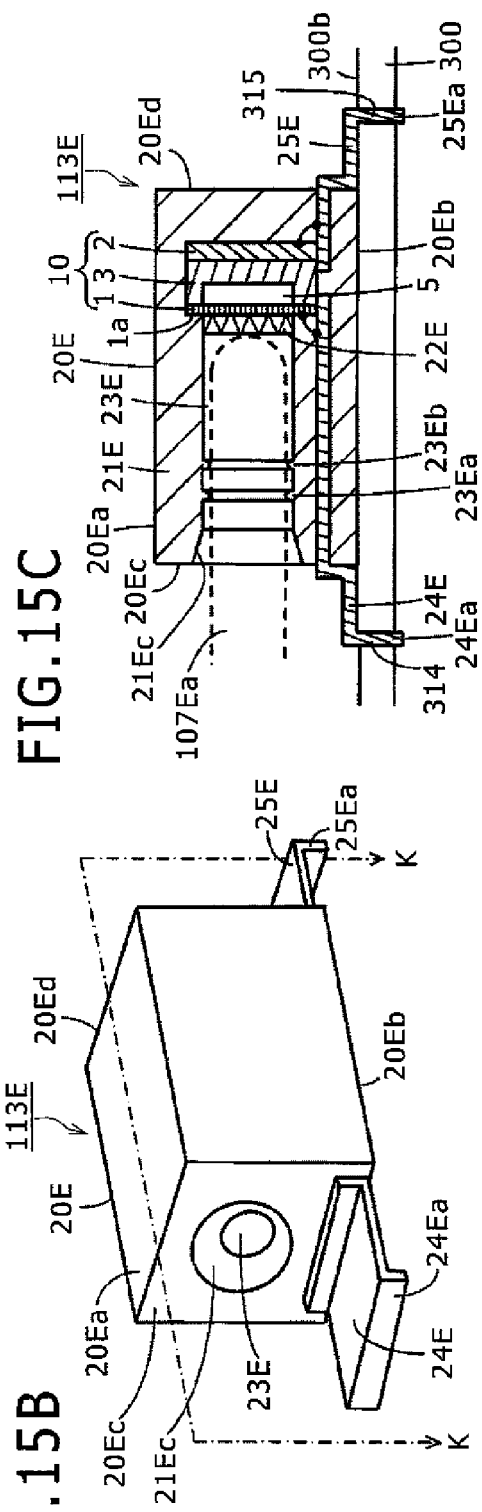
FIG.15A
FIG.15B
FIG.15C

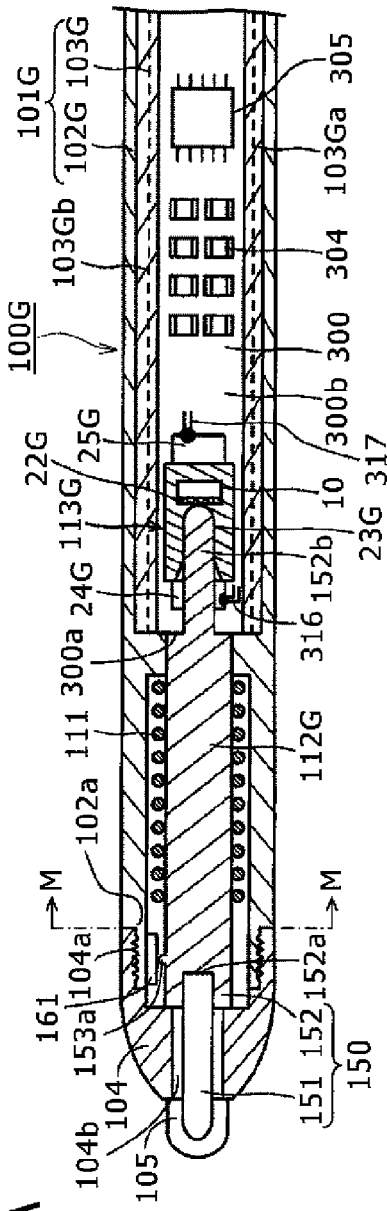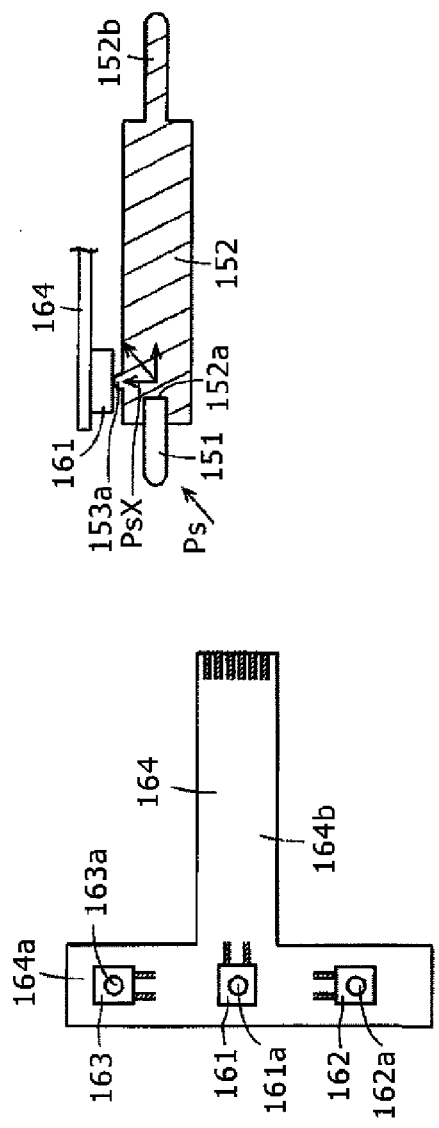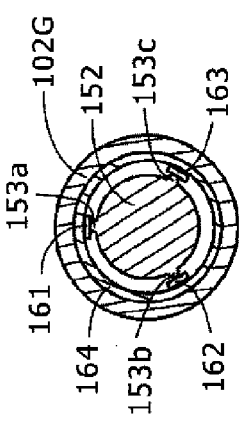

POSITION INDICATOR

CROSS-REFERENCE(S) TO RELATED APPLICATION(S)

The present application claims priority under 35 U.S.C. 119(a) of Japanese Application No. 2012-023530, filed Feb. 6, 2012, the entire content of which is incorporated herein by reference.

BACKGROUND

Technical Field

This invention relates to a position indicator that is used together with a position detecting device and that has, e.g., a pen shape, and particularly to a position indicator having a writing pressure detection function to detect pressure applied to the tip part of the position indicator.

Description of the Related Art

As an input device for a personal computer and so forth, a position input device is known that uses a position detecting device that has an input surface, on which pointing operation and input of characters, figures, etc. are performed, and that detects the operation input position on the input surface by the electromagnetic induction system. Normally, for this kind of position input device, a position indicator that has a pen-like shape and includes a writing pressure detector is used as an operation input means for the input surface of the position detecting device.

As the writing pressure detector of this position indicator, e.g., a capacitance-variable capacitor like that described in Patent Document 1 (Japanese Patent Laid-open No. Hei 4-96212) is used. The capacitance-variable capacitor described in this Patent Document 1 has a first electrode attached to one surface (hereinafter the "one surface") of a dielectric and a second electrode, which has flexibility and is disposed on the side of the other surface (hereinafter the "other surface") of the dielectric opposite to the one surface, as mechanical structural parts housed in an elongated tubular housing. Furthermore, the capacitance-variable capacitor includes a spacer means that separates the second electrode from the other surface of the dielectric by a slight gap except for a partial area, and includes a part that applies relative pressure or causes displacement between the second electrode and the dielectric. The part that applies the relative pressure or causes displacement is coupled to a core body of the position indicator having a pen shape. When a writing pressure is applied to the position indicator from one end part of its housing, the flexible second electrode is displaced due to axial-directional force applied to the core body. Thereby, the distance between the first electrode and the second electrode opposed to each other with the intermediary of the dielectric changes and the capacitance changes.

Therefore, the capacitance-variable capacitor of the position indicator in Patent Document 1 has a large number of parts—specifically, the dielectric, first electrode, second electrode, spacer, elastic body, holder to hold the dielectric, terminal members for connection between the first and second electrodes and a printed wiring board, and so forth—and these parts are separate mechanical parts. This causes a problem that the configuration of the position indicator is complicated and assembling of the position indicator takes a lot of labor hours and high cost.

On the other hand, capacitive pressure sensors fabricated by a semiconductor microfabrication technique typified by, e.g., MEMS (Micro Electro Mechanical System) technique have been proposed as disclosed in Patent Document 2 (Japanese Patent Laid-open No. Hei 11-284204), Patent Document 3 (Japanese Patent Laid-open No. 2001-83030), Patent Document 4 (Japanese Patent Laid-open No. 2004-309282), and Patent Document 5 (U.S. Published Application No. 2002/0194919), for example.

The pressure sensors disclosed in Patent Document 2 to Patent Document 5 have a semiconductor structure including a first electrode and a second electrode disposed opposite to the first electrode at a predetermined distance. The distance between the first electrode and the second electrode changes depending on the pressure applied to the first electrode. Thereby, the capacitance formed between the first electrode and the second electrode changes. Thus, the pressure can be detected as a change in the capacitance.

PRIOR ART DOCUMENTS

Patent Documents

Patent Document 1
Japanese Patent Laid-open No. Hei 4-96212
Patent Document 2
Japanese Patent Laid-open No. Hei 11-284204
Patent Document 3
Japanese Patent Laid-open No. 2001-83030
Patent Document 4
Japanese Patent Laid-open No. 2004-309282
Patent Document 5
U.S. Published Application No. 2002/0194919

BRIEF SUMMARY

Problems to be Solved by the Invention

If the capacitance-variable capacitor made with plural mechanical structural parts to allow the capacitance to be varied by pressing force from the external, like that of the above-described Patent Document 1, can be replaced with the pressure sensor configured by the MEMS technique, described in Patent Document 2 to Patent Document 5, the number of parts can be reduced. In addition, because the mechanical parts for assembling become absent, the configuration is simplified, which contributes to enhanced reliability and cost reduction.

The pressure sensor that detects pressing force from the external, like the one for writing pressure detection of the position indicator described in the above-described Patent Document 1, needs to have a structure having such high pressure resistance as to withstand high pressure much greater than, for example, the pressure level of sound pressure, to allow the pressure sensor to withstand such high pressure. In addition, in the case of the position indicator, it is preferable to have such a structure as to be capable of surely and efficiently detecting a concentrated pressure (writing pressure) from a specific direction, such as a pressure applied along the axial core direction from one end part of the housing.

However, the pressure sensors of Patent Document 2 and Patent Document 3 are ones that detect the pressure of fluid such as water and the air and cannot be used as sensors for writing pressure detection of the above-described position indicator.

Furthermore, in the pressure sensors of Patent Document 4 and Patent Document 5, e.g., a ceramic layer or a semiconductor substrate composed of, e.g., silicon receives a pressure and is bent. Thereby, the distance between the first electrode and the second electrode changes and the capacitance changes. However, these Patent Document 4 and Patent Document 5 include only a description about the behavior when the pressure is applied directly to these ceramic layer and semiconductor substrate. They do not disclose the structure that is necessary when the sensor is used for writing pressure detection of the position indicator and is for surely and efficiently detecting a concentrated pressure from a specific direction corresponding to force applied to one end part of the housing.

In view of the above points, according to one aspect of the invention, a position indicator is provided that has a simple configuration and permits reliable and efficient detection of a concentrated pressure corresponding to force applied to one end part of the housing.

Means for Solving the Problems

To solve the above-described problems, an embodiment of the invention provides a position indicator characterized by including a capacitor having capacitance that changes in correspondence to force applied to one end part of a housing. The capacitor is configured by a semiconductor element that includes a first electrode and a second electrode disposed opposite to the first electrode at a predetermined distance and has capacitance formed between the first electrode and the second electrode. The capacitance changes due to transmission of the force applied to one end part of the housing to the first electrode that causes a change in a relationship between the first and second electrodes such as the distance therebetween and/or their surface area(s). The position indicator further includes a pressure transmitting member that has predetermined elasticity and transmits force to the first electrode of the semiconductor element, and a pressing member that transmits the force applied to one end part of the housing to the pressure transmitting member having the predetermined elasticity. The force applied to one end part of the housing is transmitted to the pressure transmitting member having the predetermined elasticity by the pressing member, and the force to be applied to the first electrode of the semiconductor element is transmitted via the pressure transmitting member having the predetermined elasticity.

In the position indicator of an embodiment of the invention having the above-described configuration, the force applied to one end part of the housing is transmitted as pressure to press the first electrode of the semiconductor element forming the capacitor via the pressure transmitting member having the predetermined elasticity. Furthermore, the relationship (e.g., distance) between the first electrode and the second electrode changes depending on the pressure applied to the first electrode of the semiconductor element and thus the capacitance of the capacitor changes.

Therefore, due to the existence of the pressure transmitting member having the predetermined elasticity, direct application of the pressure corresponding to the force applied to one end part of the housing to the first electrode of the semiconductor element is eliminated. Thus, in the position indicator according to various embodiments of the invention, the semiconductor element forming the capacitor has pressure resistance against the force applied to one end part of the housing.

Furthermore, the first electrode of the semiconductor element forming the capacitor receives pressure via the pressure transmitting member having the predetermined elasticity. Therefore, the configuration can be so made that the pressure corresponding to the force applied to one end part of the housing is properly transmitted to the first electrode by the pressure transmitting member having the predetermined elasticity, and the semiconductor element forming the capacitor can detect the pressure surely (reliably) and efficiently.

Moreover, because the pressure transmitting member having the predetermined elasticity exists, the semiconductor element has shock resistance also against an unpredictably applied shock-like pressure.

Effects of the Invention

According to various embodiments of the invention, the position indicator includes a capacitor formed of a semiconductor element in a housing, and the pressure corresponding to the force applied to one end part of the housing is applied to the semiconductor element via a pressure transmitting member having a predetermined elasticity. Thus, the following position indicator can be provided. Specifically, the position indicator has pressure resistance against the force applied to one end part of the housing and can detect the force surely and efficiently. In addition, the position indicator has shock resistance against an unexpected shock-like pressure.

BRIEF DESCRIPTION OF THE DRAWINGS

FIGS. 3A and 3B are diagrams for explaining the major parts of the position indicator of the embodiment of FIGS. 1A-1D.

FIGS. 9A-9C are diagrams for explaining a configuration example of a position indicator of a second embodiment according to this invention.

FIGS. 10A-10C are diagrams for explaining a configuration example of a position indicator of a third embodiment according to this invention.

FIGS. 12A-12C are diagrams for explaining a configuration example of a position indicator of a fourth embodiment according to this invention.

FIGS. 15A-15C are diagrams for explaining a configuration example of a position indicator of a sixth embodiment according to this invention.

FIGS. 17A-17D are diagrams for explaining a configuration example of a position indicator of a seventh embodiment according to this invention.

MODES FOR CARRYING OUT THE INVENTION

First Embodiment

FIGS. 1A-1D are diagrams for explaining an embodiment of a position indicator according to this invention. FIG. 2 shows one example of electronic apparatus 200 using a position indicator 100 of this embodiment. In this example, the electronic apparatus 200 is a high-function cell-phone terminal having a display screen 200D of a display device such as LCD (Liquid Crystal Display) and includes a position detecting device 202 of the electromagnetic induction system under the display screen 200D.

The housing of the electronic apparatus 200 of this example has a housing recessed hole 201 to house the position indicator 100 having a pen shape. The user pulls out the position indicator 100 housed in the housing recessed hole 201 from the electronic apparatus 200 according to need and performs position indication operation on the display screen 200D.

In the electronic apparatus 200, when the position indication operation is performed on the display screen 200D by the position indicator 100 having the pen shape, the position detecting device 202 provided under the display screen 200D detects the position of the operation by the position indicator 100 and the writing pressure, and a microcomputer included in the position detecting device 202 of the electronic apparatus 200 executes display processing in correspondence to the operation position on the display screen 200D and the writing pressure.

Figure 1A:
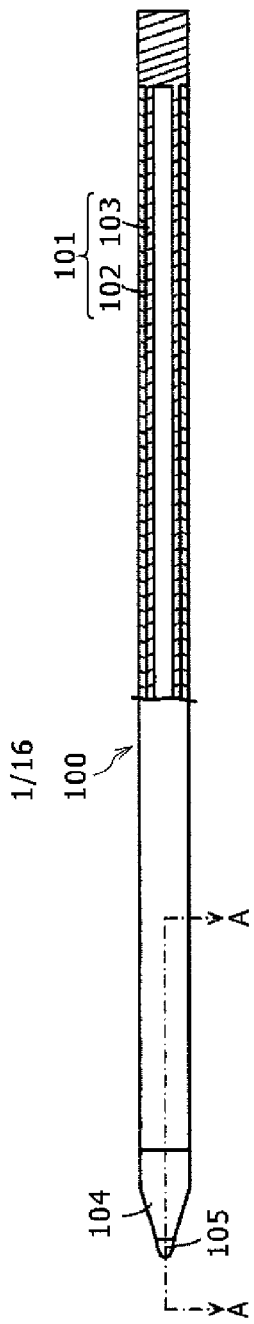
FIGS. 1A-1D are diagrams for explaining a configuration example of a position indicator of a first embodiment according to this invention.
Figure 1C:
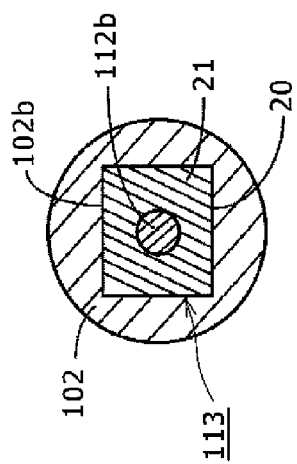
Figure 1D:
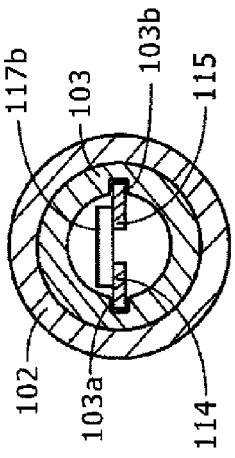
Figure 1B:
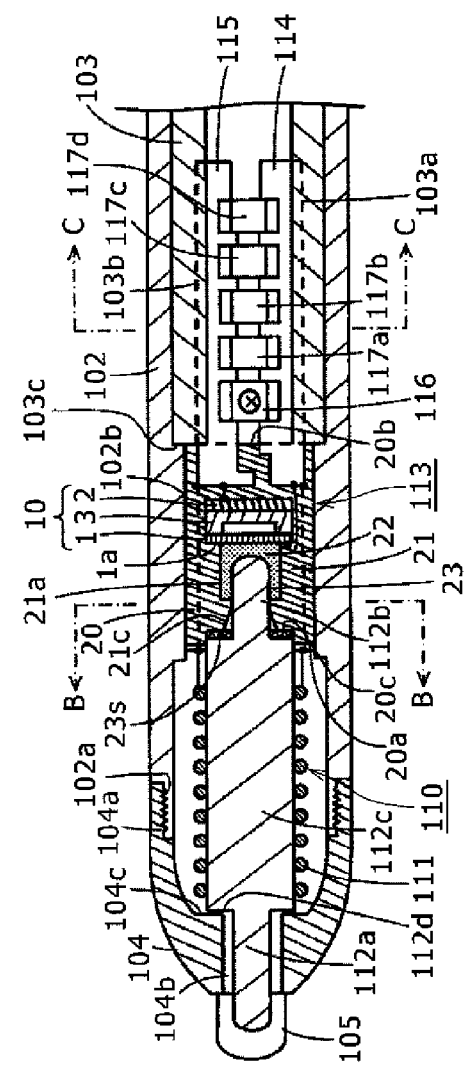
Figure 2:
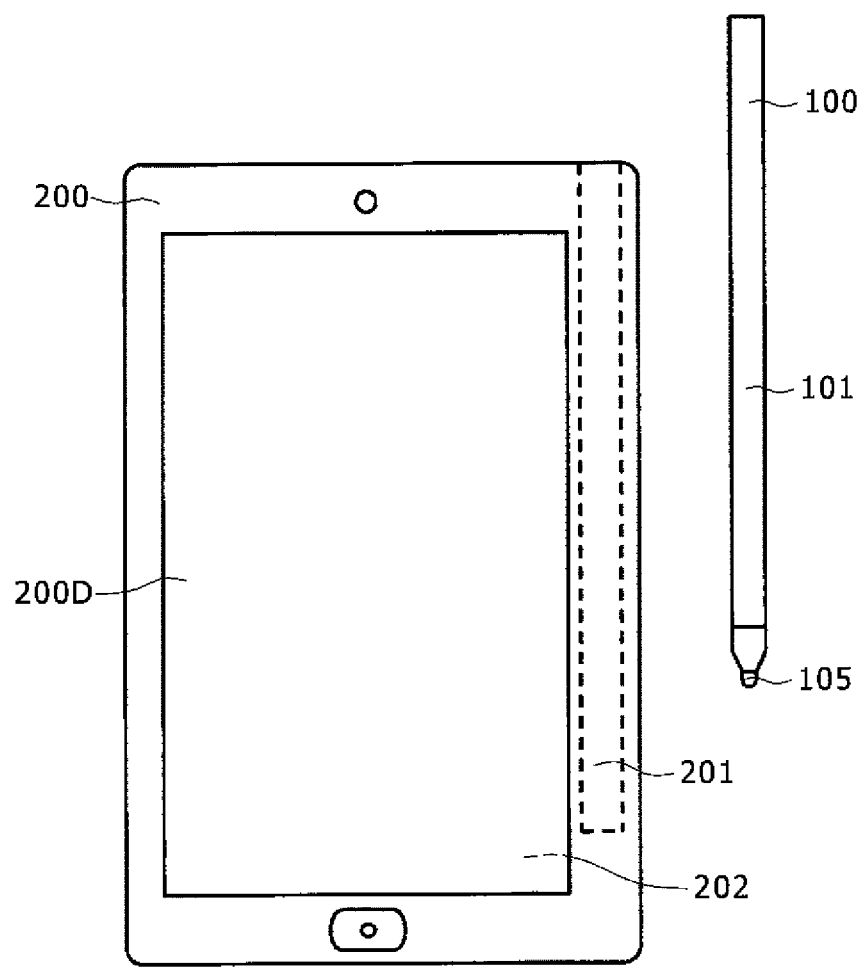
FIG. 2 is a diagram showing an example of an embodiment of the position indicator according to this invention and an electronic apparatus including a position detecting device used together with this position indicator.

FIG. 1A shows the outline of the whole of the position indicator 100 of this embodiment and shows axial half of the position indicator 100 in a sectional view. FIG. 1B is a sectional view (enlarged view) along line A-A in FIG. 1A. FIG. 1C is a sectional view along line B-B in FIG. 1B and FIG. 1D is a sectional view along line C-C in FIG. 1B.

As shown in FIG. 1A, the position indicator 100 includes a case 101 that forms a bottomed cylindrical housing that is elongated in the axial core direction and has closed one side. The case 101 is composed of a first case 102 and a second case 103 formed of, e.g., resin and has a configuration obtained by concentrically combining the first case 102 and the second case 103. In this case, both are assembled and coupled in such a manner that the second case 103 is located inside the first case 102 as shown in FIG. 1A. However, as shown in FIG. 1B, the length of the second case 103 in the axis direction is set shorter than the length of the whole of the case 101 in the axis direction (longitudinal direction) and the inner wall surface of the case 101 toward the pen tip side thereof is formed by the first case 102.

Axially one end side of the first case 102 is used as the pen tip side of the position indicator having the pen shape, so that the pen tip of the position indicator having the pen shape, i.e., the axial end part of the first case 102 that forms a housing receives pen pressure. A screw part 102a to which a pen tip sleeve 104 is screwed is formed on the pen tip side of the first case 102 as shown in FIG. 1B. The pen tip sleeve 104 has a screw part 104a screwed to the screw part 102a of the first case 102 and a penetrating hole 104b for allowing a protruding member (pen tip part) to be described later to protrude to the external.

In the case 101 of the position indicator 100, a position indicator main body 110 shown in FIG. 1B is provided. FIGS. 3A and 3B are diagrams for explaining the configuration of the position indicator main body 110. FIG. 3A is a sectional view showing the configuration of FIG. 1A except the case 101, i.e., only the position indicator main body 110. FIG. 3B is an enlarged perspective view of the center part of the position indicator main body 110.

The position indicator main body 110 of this example is composed of a position indication coil 111 as one example of the inductance element, a ferrite core 112 as one example of the magnetic material, a pressure sensing semiconductor device 113, terminal plates 114 and 115, a semi-fixed adjustment capacitor 116, and adjustment capacitors 117a, 117b, 117c, and 117d. As described later, a parallel resonant circuit is configured by the position indication coil 111, a capacitance-variable capacitor formed of the pressure sensing semiconductor device 113, and the semi-fixed adjustment capacitor 116 and the adjustment capacitors 117a, 117b, 117c, and 117d.

In the first embodiment, as shown in FIG. 3A, the position indicator main body 110 has a unit configuration in which the terminal plates 114 and 115 are led out from a package 20 of the pressure sensing semiconductor device 113 and the ferrite core 112 that forms the rod-shaped member and is made of a magnetic material is held by the package 20 to provide a monolithic structure.

As shown in FIGS. 1B and 3A, the position indication coil 111 is wound around the ferrite core 112. In this example, the ferrite core 112 has a solid circular column shape. In addition, small-diameter parts 112a and 112b with a small diameter are disposed at both ends in the center line direction of the ferrite core 112 and a large-diameter part 112c with a large diameter is disposed at the center part. The position indication coil 111 is wound around the large-diameter part 112c of the ferrite core 112. In this example, the diameter of the small-diameter parts 112a and 112b of the ferrite core 112 is set to 1 mm and the diameter of the large-diameter part 112c is set to 3 mm.

One small-diameter part 112a of the ferrite core 112 forms a protruding member that protrudes to the external via the penetrating hole 104b of the pen tip sleeve 104 as shown in FIG. 1B. In this example, at the tip of the small-diameter part 112a of the ferrite core 112, a preference adjusting member 105 is freely detachably attached in such a manner as to cover the tip, with an extremely small gap made between the preference adjusting member 105 and the pen tip sleeve 104.

The preference adjusting member 105 is a member attached to the tip of the small-diameter part 112a according to need depending on the preference of the user who performs the position indication operation. For example, by allowing the pen tip of the position indicator 100 to be replaced with the preference adjusting member(s) 105 that embody pen tips with various diameters, shapes, modulus of elasticity, materials, a desired writing feel for the position indication operation, for example with respect to the display screen 200D, can be achieved depending on the user preference.

On the other hand, the other small-diameter part 112b of the ferrite core 112 is inserted in the pressure sensing semiconductor device 113 so as to serve as a pressing member that transmits the pressure corresponding to the writing pressure to the pressure sensing semiconductor device 113. In this example, the position indicator main body 110 is so configured that a portion of the large-diameter part 112c of the ferrite core 112 is also held in the package 20 of the pressure sensing semiconductor device 113, as shown in FIGS. 1B and 3A.

Configuration Examples of Pressure Sensing Semiconductor Device 113

The configuration of the pressure sensing semiconductor device 113 of this example will be described below.

In the pressure sensing semiconductor device 113 of this example, a pressure detecting chip 10 configured as, e.g., a semiconductor element fabricated by a MEMS technique is sealed in the package 20 having, e.g., a cubic or rectangular parallelepiped box shape (see FIG. 3).

Figure 4A:
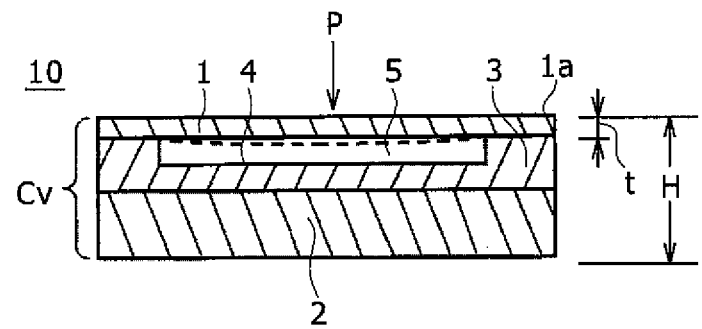
FIGS. 4A-4C are diagrams for explaining one example of a capacitor formed of a semiconductor element included in an embodiment of the position indicator according to this invention.
Figure 4B:
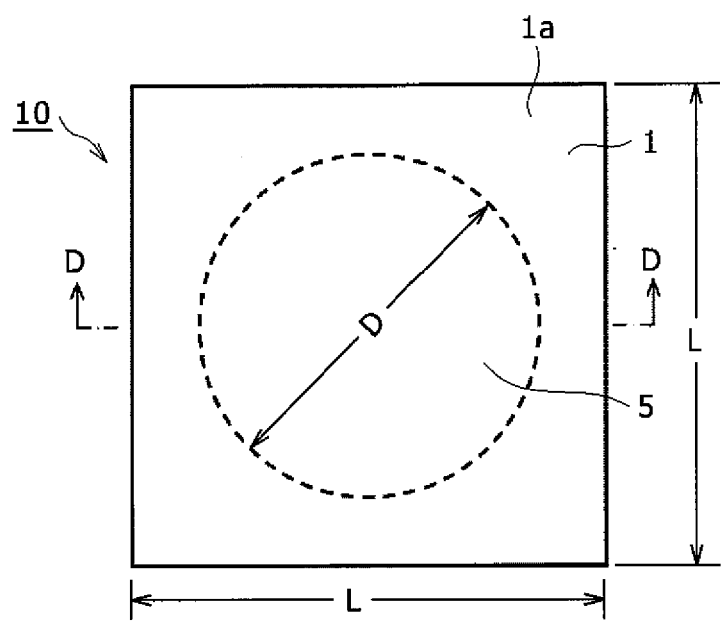
Figure 4C:
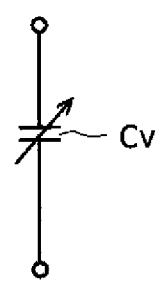

The pressure detecting chip 10 detects applied pressure as change in capacitance and has a configuration shown in FIGS. 4A-4C in this example. FIG. 4B is a diagram of the pressure detecting chip 10 of this example as viewed from the side of a surface 1a that receives a pressure P (see FIG. 4A). FIG. 4A is a sectional view along line D-D in FIG. 4B.

As shown in FIGS. 4A and 4B, the pressure detecting chip 10 of this example has a rectangular parallelepiped shape of length×width×height=L×L×H. In this example, L=1.5 mm and H=0.5 mm.

The pressure detecting chip 10 of this example is composed of a first electrode 1, a second electrode 2, and an insulating layer (dielectric layer) 3 between the first electrode 1 and the second electrode 2. The first electrode 1 and the second electrode 2 are formed of a conductor composed of single-crystal silicon (Si) in this example. The insulating layer 3 is formed of an insulating film composed of an oxide film ($SiO_2$) in this example. The insulating layer 3 does not need to be formed of an oxide film and may be formed of another insulating object.

On the side of the surface of this insulating layer 3 facing the first electrode 1, a circular recess 4 centered at the center position of this surface is formed in this example. By this recess 4, a space 5 is formed between the insulating layer 3 and the first electrode 1. In this example, the bottom surface of the recess 4 is a flat surface and the diameter D thereof is set to, e.g., D=1 mm. Furthermore, the depth of the recess 4 is set to several tens of microns to several hundreds of microns in this example.

The pressure detecting chip 10 of this example is fabricated by a semiconductor process in the following manner. First, the insulating layer 3 formed of an oxide film is formed on single-crystal silicon forming the second electrode 2. Next, the recess 4 is formed by disposing a mask, which covers the part other than the circular part with the diameter D, and performing etching so that the space 5 may be formed in this insulating layer 3 of the oxide film. Then, single-crystal silicon forming the first electrode 1 is bonded onto the insulating layer 3. Thereby, the pressure detecting chip 10 having the space 5 below the first electrode 1 is formed.

The existence of this space 5 allows the first electrode 1 to be so displaced as to bend toward the space 5 when being pressed from the side of the surface 1a opposite to the surface facing the second electrode 2. The thickness t of the single-crystal silicon as an example of the first electrode 1 is set to such a thickness as to allow bending by the applied pressure P and is set smaller than the thickness of the second electrode 2. This thickness t of the first electrode 1 is so selected that a desired bending displacement characteristic is obtained for the first electrode 1 as a function of the applied pressure P, as described later.

The pressure detecting chip 10 having the above-described configuration is a capacitor in which capacitance Cv is formed between the first electrode 1 and the second electrode 2. When the pressure P is applied to the first electrode 1 from the side of the surface 1a of the first electrode 1 opposite to the surface facing the second electrode 2 as shown in FIG. 4A, the first electrode 1 bends as shown by the dotted line in FIG. 4A and the distance between the first electrode 1 and the second electrode 2 is shortened; otherwise the surface area of at least the first electrode 1 is changed (enlarged in the example of FIG. 4A). Thus, the value of the capacitance Cv changes to become larger. The amount of bending of the first electrode 1 changes in correspondence to the magnitude of the applied pressure P. Therefore, the capacitance Cv changes depending on the magnitude of the pressure P applied to the pressure detecting chip 10 as shown by an equivalent circuit of FIG. 4C.

Bending by several microns is caused by pressure in the single-crystal silicon shown as an example of the first electrode 1. The capacitance Cv of the capacitor formed of the pressure detecting chip 10 shows a change of 0 to 250 pF (picofarad) due to the pressing force P that causes this bending.

In the pressure sensing semiconductor device 113 of this embodiment, the pressure detecting chip 10 having the above-described configuration is housed in the package 20 in the state in which the surface 1a of the first electrode 1, which receives pressure, is facing a top surface 20a of the package 20 in FIGS. 1B, 3A, and 3B.

In this example, the package 20 is composed of a package member 21, which is formed of an electrical insulating material such as a ceramic material and a resin material, and an elastic member 22 provided on the side of the surface 1a, across which the pressure detecting chip 10 receives pressure, in the package member 21. The elastic member 22 is one example of the pressure transmitting member having predetermined elasticity.

Furthermore, in this example, in the package member 21, a recess 21a corresponding to the area of the first electrode 1 is made at a portion above the surface 1a of the first electrode 1, across which the pressure detecting chip 10 receives pressure, and the elastic member 22 is so disposed as to be packed in this recess 21a. In this example, the elastic member 22 is formed of a silicone resin having predetermined elasticity, and particularly formed of silicone rubber.

In the package 20, a communication hole 23 that communicates from the top surface 20a to a portion of the elastic member 22 is formed. Specifically, a penetrating hole 21b forming part of the communication hole 23 is formed in the package member 21 and a recessed hole 22a forming the end part of the communication hole 23 is made in the elastic member 22 (see FIG. 3A). Furthermore, a taper part 21c is formed on the side of the opening part of the communication hole 23 of the package member 21 (on the side of the top surface 20a) and the opening part of the communication hole 23 is formed into a trumpet shape.

As shown in FIGS. 1B, 3A, and 3B, the small-diameter part 112b of the ferrite core 112 is inserted in the communication hole 23 for the pressure sensing semiconductor device 113. In this case, the pressure P corresponding to the writing pressure applied to the small-diameter part 112a of the ferrite core 112 forming the protruding member as the pen tip part is transmitted to the pressure detecting chip 10 of the pressure sensing semiconductor device 113 along the axial core direction (center line direction) of the ferrite core 112. In this example, the inner diameter of the penetrating hole 21b of the package member 21 is set slightly larger than the diameter of the part of the small-diameter part 112b of the ferrite core 112 abutting against the penetrating hole 21b. In addition, the inner diameter of the recessed hole 22a of the elastic member 22 is set slightly smaller than the diameter of the part of the small-diameter part 112b of the ferrite core 112 abutting against the recessed hole 22a. This provides a configuration that facilitates guiding of the small-diameter part 112b of the ferrite core 112 to the inside of the pressure sensing semiconductor device 113 by the taper part 21c and the penetrating hole 21b, and the ferrite core 112 whose small-diameter part 112b is inserted in the pressure sensing semiconductor device 113 is so held as not to easily drop off.

Specifically, because the opening part of the communication hole 23 has a trumpet shape, the small-diameter part 112b of the ferrite core 112 is guided by the taper part 21c at this opening part to be easily led and inserted into the communication hole 23. Furthermore, the small-diameter part 112b of the ferrite core 112 is pushed to the inside of the recessed hole 22a of the elastic member 22 at the end part of the communication hole 23. In this manner, the small-diameter part 112b of the ferrite core 112 is inserted into the communication hole 23 of the pressure sensing semiconductor device 113 to be thereby positioned so as to apply the pressure P along the axial core direction to the side of the surface across which the pressure detecting chip 10 receives pressure.

In this case, because the inner diameter of the recessed hole 22a is slightly smaller than the diameter of the part of the small-diameter part 112b of the ferrite core 112 abutting against the recessed hole 22a, the small-diameter part 112b of the ferrite core 112 becomes elastically held by the elastic member 22 in the recessed hole 22a of the elastic member 22. That is, when being inserted in the communication hole 23 of the pressure sensing semiconductor device 113, the small-diameter part 112b of the ferrite core 112 is held by the pressure sensing semiconductor device 113.

In this example, the package 20 of the pressure sensing semiconductor device 113 has, on the side of the top surface 20a, a recess 20c for fittedly receiving and holding a portion of the large-diameter part 112c of the ferrite core 112. The package 20 holds the ferrite core 112 in the state in which the small-diameter part 112b of the ferrite core 112 is inserted in the communication hole 23 of the package 20 and a portion of the large-diameter part 112c of the ferrite core 112 is fitted to the recess 20c.

In this case, a cushion member 23s is provided between the step part made by the large-diameter part 112c to the small-diameter part 112b of the ferrite core 112 and the bottom of the recess 20c of the package 20 of the pressure sensing semiconductor device 113 so that the small-diameter part 112b of the ferrite core 112 will not limit bending of the first electrode of the pressure detecting chip 10 toward the space 5 when pressure is applied. It is also possible that the package member 21 forming the package 20 is formed of the same material as that of the elastic member 22, specifically, e.g., a silicone resin.

Furthermore, as shown in FIGS. 1B, 3A, and 3B, from a bottom surface 20b opposite to the top surface 20a of the package 20 of the pressure sensing semiconductor device 113, the first terminal plate 114 connected to the first electrode 1 of the pressure detecting chip 10 is led out and the second terminal plate 115 connected to the second electrode 2 of the pressure detecting chip 10 is led out. The first terminal plate 114 is electrically connected to the first electrode 1 by a gold wire 31 for example. The second terminal plate 115 is electrically connected to the second electrode 2 by a gold wire 32.

In this example, the first and second terminal plates 114 and 115 are formed of a plate-shaped conductor and have a wide width as shown in the diagram. Furthermore, in this example, the first and second terminal plates 114 and 115 are led out from the bottom surface 20b of the package 20 in the direction perpendicular to the bottom surface 20b and are disposed with the intermediary of a predetermined interval with their plate surfaces flush with each other as shown in FIGS. 1B, 3A, and 3B.

One end and the other end of each of the semi-fixed adjustment capacitor 116 and the adjustment capacitors 117a, 117b, 117c, and 117d are electrically connected onto the plate surfaces of the first terminal plate 114 and the second terminal plate 115 by, e.g., soldering in such a manner that the capacitors bridge across the terminal plates 114 and 115.

In this case, the semi-fixed adjustment capacitor 116 and the adjustment capacitors 117a, 117b, 117c, and 117d form a resonant circuit together with the position indication coil 111. The semi-fixed adjustment capacitor 116 enables adjustment of the resonant frequency of the resonant circuit through adjustment of its capacitance by use of a tool from the external. The adjustment capacitors 117a, 117b, 117c, and 117d are to similarly adjust the resonant frequency of the resonant circuit through adjustment of the number thereof. The number of adjustment capacitors can be adjusted by connecting a predetermined number of capacitors to the first and second terminal plates 114 and 115 in advance and cutting the first and second terminal plates 114 and 115 at the place corresponding to the necessary number of adjustment capacitors. Alternatively, it is also possible to adjust the number by additionally connecting desired adjustment capacitors between the first and second terminal plates 114 and 115.

Figure 5:
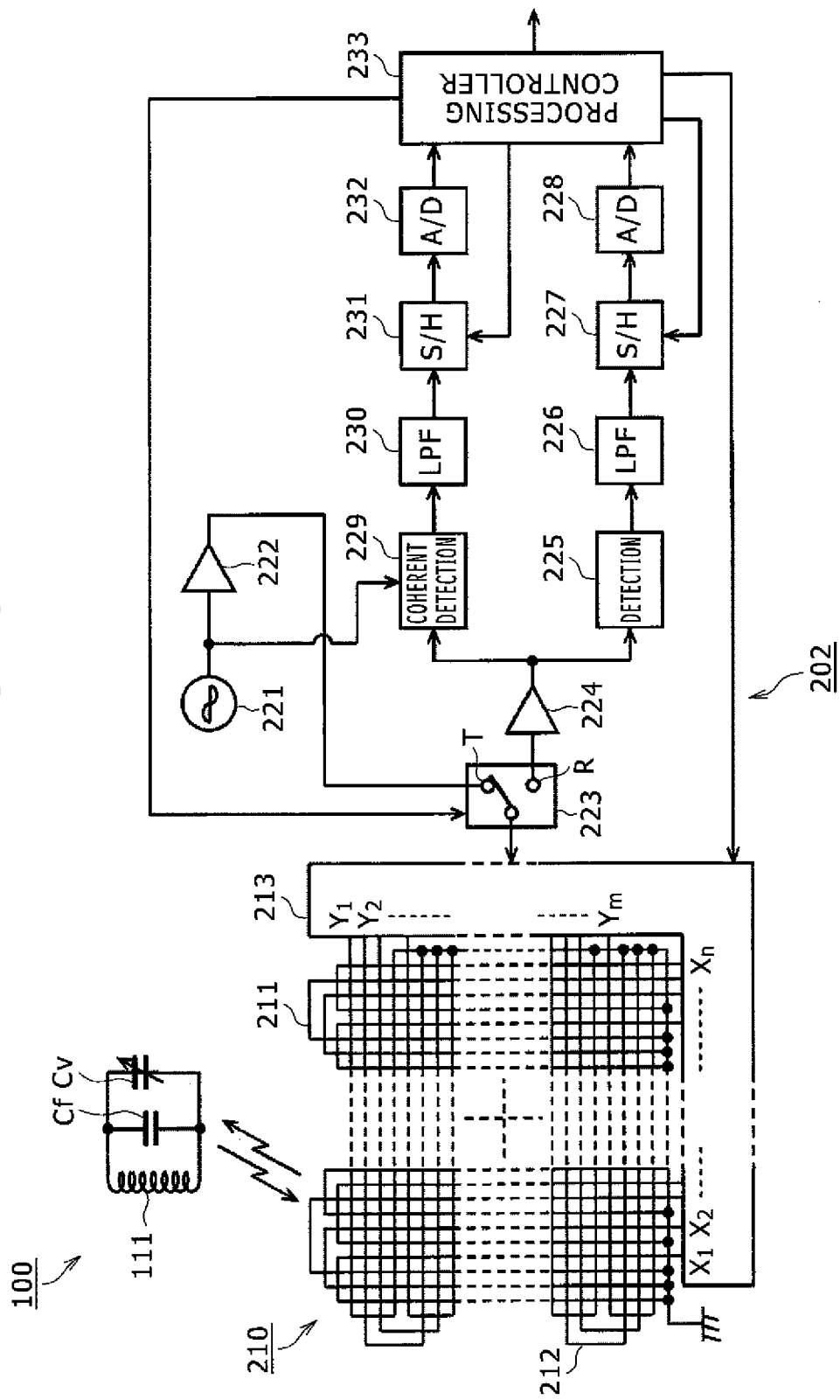
FIG. 5 is a diagram for explaining a configuration example of the position detecting device used together with an embodiment of the position indicator according to this invention.

In this example, as shown in FIGS. 3A and 3B, terminals 118 and 119 electrically connected (shown by dotted lines) to the first and second terminal plates 114 and 115, respectively, are provided on the top surface 20a of the package 20. Furthermore, these terminals 118 and 119 are connected to one end and the other end, respectively, of the position indication coil 111 wound around the large-diameter part 112c of the ferrite core 112. This allows the position indicator main body 110 made as a unit to constitute a parallel resonant circuit formed by the position indication coil 111, the capacitance Cv of the pressure detecting chip 10 of the pressure sensing semiconductor device 113, and capacitance Cf formed of the semi-fixed adjustment capacitor 116 and the adjustment capacitors 117a, 117b, 117c, and 117d as shown in FIG. 5 to be described later.

As shown in FIG. 1D, in the inner wall surface of the second case 103 of the case 101, trenches 103a and 103b to hold the widthwise end parts of the first terminal plate 114 and the second terminal plate 115 of the position indicator main body 110 are formed. The position indicator main body 110 is housed in the case 101 in such a manner that the widthwise end parts of the first terminal plate 114 and the second terminal plate 115 are inserted in the trenches 103a and 103b in the inner wall surface of the second case 103. The trenches 103a and 103b in the inner wall surface of the second case 103 are formed to extend from a tip part 103c of the second case 103 for a length equal to that of the first and second terminal plates 114 and 115. Therefore, the position of the position indicator main body 110 in the axis direction thereof is locked by the trenches 103a and 103b in the inner wall surface of the second case 103.

Moreover, the tip part 103c of the second case 103 forms a step part with the inner wall surface of the first case 102. The tip part 103c of the second case 103 forming this step part abuts against the bottom surface 20b of the package 20 of the position indicator main body 110 and the axial position of the position indicator main body 110 in the case 101 is restricted also by this step part. That is, the position indicator main body 110 is locked by the trenches 103a and 103b in the inner wall of the second case 103 and the tip part 103c against pressure from the pen tip side along the axis direction of the case 101, and the pressure sensing semiconductor device 113 can receive writing pressure along the axis direction.

As shown in FIG. 1C, an inner wall surface part 102b of the first case 102 facing the side surface of the package 20 of the pressure sensing semiconductor device 113 has a rectangular sectional shape that matches the outer shape of the package 20 of the pressure sensing semiconductor device 113. Therefore, when the position indicator main body 110 is housed in the case 101, the package 20 of the pressure sensing semiconductor device 113 is held by the inner wall surface part of the first case 102 with the rectangular sectional shape.

The pen tip sleeve 104 has a wall part 104c shaped to engage with a step part 112d made by the large-diameter part 112c and the small-diameter part 112a of the ferrite core 112 of the position indicator main body 110 housed in the case 101. The wall part 104c is shaped to engage with the step part 112d of the ferrite core 112 when the pen tip sleeve 104 is screwed to the first case 102. This restricts the position of the position indicator main body 110 housed in the case 101 in the axis direction.

When pressing force is applied to the pen tip side of the position indicator 100 along the axial core direction in this state, i.e., when a writing pressure is applied, the ferrite core 112 presses the pressure detecting chip 10 via the elastic member 22 of the pressure sensing semiconductor device 113 with the pressure corresponding to the writing pressure. As described above, the capacitance Cv of the pressure detecting chip 10 changes depending on the writing pressure transmitted to the pressure detecting chip 10.

In this case, as shown in FIGS. 1B and 3A, the pressure is applied to the first electrode 1 via the elastic member 22 on the side of the surface 1a, which receives the pressure. This causes the pressure detecting chip 10 to show the capacitance Cv corresponding to the writing pressure applied by the small-diameter part 112b of the ferrite core 112.

In this case, the side of the surface across which the pressure detecting chip 10 receives the pressure is not directly pressed by the small-diameter part 112b of the ferrite core 112, and the elastic member 22 exists between the small-diameter part 112b of the ferrite core 112 and the pressure detecting chip 10. This enhances the pressure resistance and shock resistance on the side of the surface across which the pressure detecting chip 10 receives the pressure and can prevent this surface side from being broken by excessive pressure, unexpected instantaneous pressure, etc. That is, in the pressure sensing semiconductor device 113, the pressure detecting chip 10 receives the pressure due to the writing pressure via the elastic member 22 as the pressure transmitting member having predetermined elasticity. Therefore, the pressure sensing semiconductor device 113 has pressure resistance and shock resistance against the pressure applied to the pressure detecting chip 10, specifically the first electrode 1.

Furthermore, the small-diameter part 112b of the ferrite core 112 is inserted in and guided by the communication hole 23 made in the package 20 of the pressure sensing semiconductor device 113 to thereby be positioned. Therefore, the applied writing pressure is surely transmitted to the pressure detecting chip 10 via the elastic member 22.

The applied writing pressure is transmitted as a pressure to the surface 1a of the first electrode 1 of the pressure detecting chip 10 by the elastic member 22. Therefore, the applied writing pressure is surely applied to the surface 1a, across which the pressure detecting chip 10 receives the pressure, and the pressure sensing semiconductor device 113 shows a capacitance change corresponding to the writing pressure P. This permits desired detection of the writing pressure.

Circuit Configuration for Position Detection and Writing Pressure Detection in Electronic Apparatus 200

FIG. 5 shows a circuit configuration example in the position detecting device 202 of the electronic apparatus 200 to detect the indicated position and the writing pressure based on use of the position indicator 100 of the above-described embodiment. FIG. 5 is a block diagram showing the circuit configuration example of the position indicator 100 and the position detecting device 202 included in the electronic apparatus 200.

The position indicator 100 has, as the circuit configuration, a resonant circuit obtained by connecting in parallel the position indication coil 111 as an inductance element, the variable capacitance Cv of the capacitor configured by the pressure detecting chip 10 as a semiconductor element, and the fixed capacitance Cf formed of the semi-fixed adjustment capacitor 116 and the adjustment capacitors 117a, 117b, 117c, and 117d as described above.

In the position detecting device 202 of the electronic apparatus 200, a position detection coil 210 is formed by stacking an X-axis-direction loop coil group 211 and a Y-axis-direction loop coil group 212. The respective loop coil groups 211 and 212 are composed of, e.g., n and m rectangular loop coils, respectively. The respective loop coils forming the respective loop coil groups 211 and 212 are so disposed as to be arranged at equal intervals and to sequentially overlap with each other.

Furthermore, in the position detecting device 202, a selection circuit 213 to which the X-axis-direction loop coil group 211 and the Y-axis-direction loop coil group 212 are connected is provided. The selection circuit 213 sequentially selects one loop coil in two loop coil groups 211 and 212.

Moreover, the following units are provided in the position detecting device 202: an oscillator 221, a current driver 222, a switch connection circuit 223, a receiving amplifier 224, a detector 225, a low-pass filter 226, a sample/hold circuit 227, an A/D conversion circuit 228, a coherent detector 229, a low-pass filter 230, a sample/hold circuit 231, an A/D conversion circuit 232, and a processing controller 233. The processing controller 233 is configured by a microcomputer.

The oscillator 221 generates an alternating-current (AC) signal with a frequency f0. The oscillator 221 supplies the generated AC signal to the current driver 222 and the coherent detector 229. The current driver 222 converts the AC signal supplied from the oscillator 221 to a current and sends it out to the switch connection circuit 223. The switch connection circuit 223 switches the connection target (transmission-side terminal T or reception-side terminal R), to which the loop coil selected by the selection circuit 213 is connected, under control of the processing controller 233. Of these connection targets, the transmission-side terminal T is connected to the current driver 222 and the reception-side terminal R is connected to the receiving amplifier 224.

An induced voltage generated in the loop coil selected by the selection circuit 213 is sent to the receiving amplifier 224 via the selection circuit 213 and the switch connection circuit 223. The receiving amplifier 224 amplifies the induced voltage supplied from the loop coil and sends out the amplified voltage to the detector 225 and the coherent detector 229.

The detector 225 detects the induced voltage generated in the loop coil, i.e., a reception signal, and sends it out to the low-pass filter 226. The low-pass filter 226 has a cutoff frequency sufficiently lower than the above-described frequency f0. It converts the output signal of the detector 225 to a direct-current (DC) signal and sends it out to the sample/hold circuit 227. The sample/hold circuit 227 holds a voltage value at predetermined timing of the output signal of the low-pass filter 226, specifically at predetermined timing in the reception period, and sends it out to the A/D (Analog to Digital) conversion circuit 228. The A/D conversion circuit 228 converts the analog output of the sample/hold circuit 227 to a digital signal and outputs it to the processing controller 233.

The coherent detector 229 performs coherent detection of the output signal of the receiving amplifier 224 with an AC signal from the oscillator 221 and sends out a signal having the level corresponding to the phase difference between them to the low-pass filter 230. The low-pass filter 230 has a cutoff frequency sufficiently lower than the frequency f0. It converts the output signal of the coherent detector 229 to a DC signal and sends it out to the sample/hold circuit 231. This sample/hold circuit 231 holds a voltage value at predetermined timing of the output signal of the low-pass filter 230 and sends it out to the A/D (Analog to Digital) conversion circuit 232. The A/D conversion circuit 232 converts the analog output of the sample/hold circuit 231 to a digital signal and outputs it to the processing controller 233.

The processing controller 233 controls the respective units of the position detecting device 202. Specifically, the processing controller 233 controls selection of the loop coil in the selection circuit 213, switch of the switch connection circuit 223, and the timing of the sample/hold circuits 227 and 231. Based on the input signals from the A/D conversion circuits 228 and 232, the processing controller 233 transmits radio waves from the X-axis-direction loop coil group 211 and the Y-axis-direction loop coil group 212 for a certain transmission continuation time.

An induced voltage is generated in the respective loop coils of the X-axis-direction loop coil group 211 and the Y-axis-direction loop coil group 212 based on radio waves transmitted from the position indicator 100. The processing controller 233 calculates the coordinate values of the position indicated by the position indicator 100 along both the X-axis direction and the Y-axis direction based on the level of the voltage value of the induced voltage generated in the respective loop coils. Furthermore, the processing controller 233 detects the writing pressure based on the level of the signal corresponding to the phase difference between the transmitted radio waves and the received radio waves.

In this manner, in the position detecting device 202, the position of the position indicator 100 that is located near the position detecting device 202 can be detected by the processing controller 233. In addition, information on the writing pressure value of the position indicator 100 can be obtained by detecting the phase of the received signal.

Modification Examples of First Embodiment

Adjustment of Writing Pressure-Capacitance Change Characteristic

First Example

In the pressure detecting chip 10 of the pressure sensing semiconductor device 113 of the above-described first embodiment, when the thickness t of the single-crystal silicon forming the first electrode 1, to which pressure (writing pressure) is applied, is changed, the amount of bending of the first electrode 1 that corresponds to the writing pressure will vary. Therefore, by selecting a desired thickness t of the first electrode 1, the change characteristic of the capacitance Cv of the pressure detecting chip 10 as a function of the writing pressure can be varied.

Figure 6:
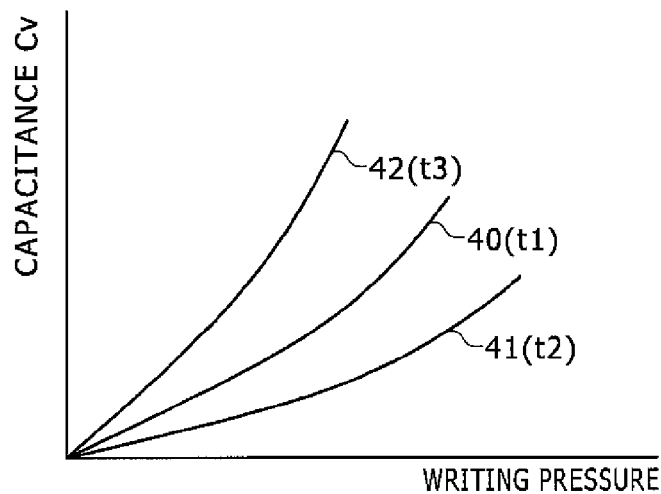
FIG. 6 is a diagram for explaining characteristic examples of the capacitor formed of the semiconductor element included in an embodiment of the position indicator according to this invention.

FIG. 6 is a characteristic diagram showing an example of the change characteristic of the capacitance Cv as a function of the writing pressure applied to the pressure detecting chip 10. As shown in FIG. 6, when the thickness t of the first electrode 1 is t1, the change characteristic of the capacitance Cv of the pressure detecting chip 10 as a function of the applied writing pressure is as shown by a curve 40.

When the thickness t of the first electrode 1 is set to t2 larger than t1 (t2>t1), the first electrode 1 bends less readily in response to the applied writing pressure. Therefore, although showing a change similar to that of the curve 40, the change characteristic of the capacitance Cv as a function of the applied writing pressure is as shown by a curve 41, which shows a gentler change than the curve 40.

When the thickness t of the first electrode 1 is set to t3 smaller than t1 (t3<t1), the first electrode 1 bends more readily in response to the applied writing pressure. Therefore, although showing a change similar to that of the curve 40, the change characteristic of the capacitance Cv as a function of the applied writing pressure is as shown by a curve 42, which shows a sharper change than the curve 40.

In the above-described manner, a desired characteristic can be obtained as the change characteristic of the capacitance Cv as a function of the applied writing pressure by varying the thickness t of the first electrode 1 of the pressure detecting chip 10.

In the above-described example, the thickness t of the first electrode 1 is varied. However, by changing the material of the first electrode 1 to a material that bends more readily or a material that bends less readily, the change characteristic of the capacitance Cv of the pressure detecting chip 10 as a function of the applied writing pressure can be varied even when the thickness t is kept the same. In this case, it is also possible to vary the capacitance change characteristic more finely by changing the thickness t in addition to changing the material of the first electrode 1.

It is also possible to change the application characteristic (transmission characteristic) of writing pressure to the pressure detecting chip 10 by selecting the modulus of elasticity of the elastic member 22 or by giving a variation to the engagement relationship (e.g., the shape or form of abutting or interfacing) between the elastic member 22 and the first electrode 1. Therefore, it is also possible to vary the change characteristic of the capacitance Cv of the pressure detecting chip 10 by such a method.

Second Example

In the above-described example, the change characteristics of the capacitance Cv as a function of the writing pressure applied to the pressure detecting chip 10 have tendencies similar to each other. A second example is an example having a characteristic that the change rates of the change characteristic of the capacitance Cv as a function of the writing pressure applied to the pressure detecting chip 10, i.e., the tendencies of so-called gradient change, are different from each other.

Figure 7A:
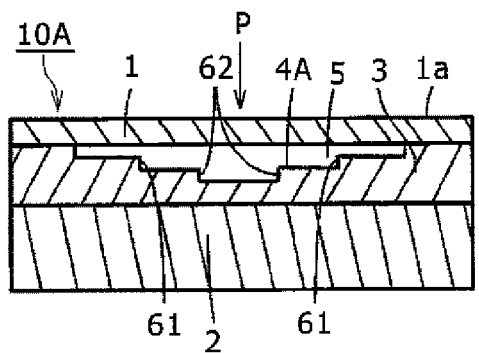
FIGS. 7A and 7B are diagrams for explaining other examples of the capacitor formed of the semiconductor element included in an embodiment of the position indicator according to this invention.
Figure 7B:
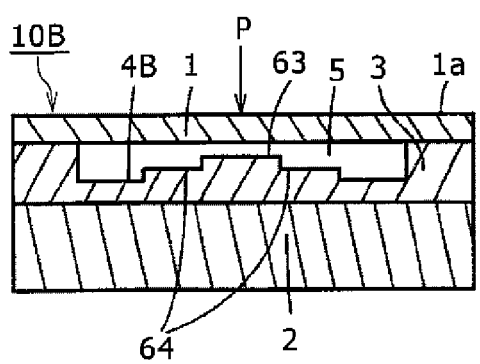

In the second example, one surface of the recess 4 of the insulating layer 3 of the pressure detecting chip 10, specifically the surface that is facing the first electrode 1 to form the space 5, is formed not as an evenly-flat surface but as a surface having a shape yielding uneven thickness. Thereby, a desired characteristic is obtained as the change characteristic of the capacitance Cv as a function of writing pressure to the pressure detecting chip 10. FIGS. 7A and 7B are diagrams for explaining pressure detecting chips 10A and 10B of this second example and are each a sectional view corresponding to the sectional view of the above-described pressure detecting chip 10 shown in FIG. 4A. In FIGS. 7A and 7B, the same part as that of the above-described pressure detecting chip 10 is given the same reference symbol and description thereof is omitted.

In the pressure detecting chip 10A of the example of FIG. 7A, a recess 4A formed in the insulating layer 3 has a shape in which the thickness changes in such a manner that the surface of the recess 4A that faces the first electrode 1 gradually becomes deeper. In this example, two step parts 61 and 62 are formed to make the surface of the recess 4A facing the first electrode 1 gradually deeper. The step parts 61 and 62 are formed in the following manner. Specifically, after the recess 4A is formed in the above-described manner, a process of disposing a mask covering the area other than a circular area having a predetermined size in the bottom surface of the recess 4A facing the first electrode 1 and further performing etching treatment is repeated. By this etching treatment, the circular area that is not covered by the mask becomes a recess whose depth is larger than that of the surrounding area thereof, so that the step parts 61 and 62 are formed.

Figure 8:
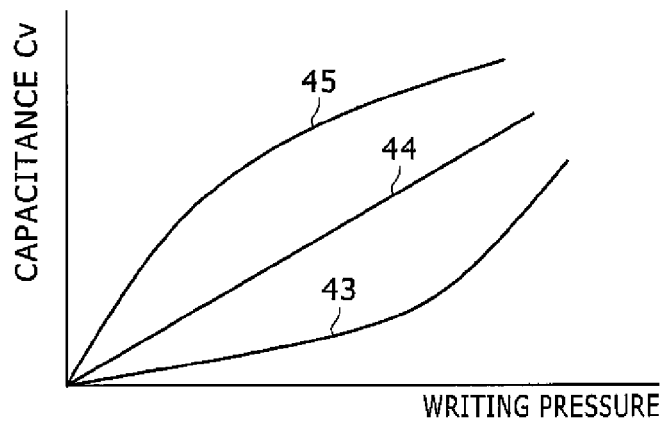
FIG. 8 is a diagram for explaining characteristic examples of other examples of the capacitor formed of the semiconductor element included in an embodiment of the position indicator according to this invention.

Suppose that a curve 43 in FIG. 8 is the characteristic curve of the capacitance Cv as a function of applied pressure in the case of the above-described pressure detecting chip 10 having the recess 4, whose surface facing the first electrode 1 is a flat surface. In this case, the pressure detecting chip 10A of the example of FIG. 7A has a characteristic shown by a curve 44 in FIG. 8. Specifically, it has such a characteristic that the capacitance Cv substantially linearly changes in proportion to the applied pressure.

The method for making the shape in which the surface of the recess 4A facing the first electrode 1 gradually becomes deeper in order to obtain the characteristic shown by the curve 44 in FIG. 8 is not limited to the method in which the step parts 61 and 62 are made like the above-described example. For example, a recess having a curved surface shape may be formed, wherein the curved surface shape facing the first electrode 1 becomes gradually deeper in the direction toward the center of the recess 4A.

Next, in the pressure detecting chip 10B of the example of FIG. 7B, differently from the example of FIG. 7A, a recess 4B formed in the insulating layer 3 has a shape in which the thickness changes in such a manner that the surface of the recess 4B facing the first electrode 1 gradually becomes closer to the first electrode 1 in the direction from the peripheral part thereof to the center part thereof. In this example, bulge parts 63 and 64 that bulge toward the first electrode 1 are formed in the surface of the recess 4B facing the first electrode 1.

In the case of this example, first, a mask is disposed at the part except the part of the bulge part 63 in the oxide film forming the insulating layer 3 and etching treatment is performed to form the part of the bulge part 63. Next, the part of the bulge part 63 is masked while the part of the bulge part 64 around this bulge part 63 is exposed. In this state, etching treatment is performed to form an area whose depth is larger than that of the bulge part 63 around the part of the bulge part 63 to thereby form the bulge part 64. Next, the parts of the bulge parts 63 and 64 are masked while the part of the recess 4B around the bulge parts 63 and 64 is exposed. In this state, etching treatment is performed to form an area whose depth is larger than that of the bulge part 64 around the parts of the bulge parts 63 and 64. By repeatedly performing such treatment according to need, the space 5 having such a shape that the center part bulges compared with the peripheral part like that shown in FIG. 7B can be formed.

In the case of this example of FIG. 7B, the characteristic curve of the capacitance Cv as a function of pressure applied to the pressure detecting chip 10B is as shown by a curve 45 in FIG. 8. Specifically, in this characteristic, the capacitance greatly (sharply) changes when the applied writing pressure is low and the change in the capacitance becomes smaller when the applied writing pressure is high.

The method for making such a shape that the distance between the first electrode 1 and the surface of the recess 4B facing the first electrode 1 becomes shorter in the direction toward the center of the recess 4B in order to obtain the characteristic shown by the curve 45 in FIG. 8 is not limited to the method in which the bulge parts 63 and 64 are formed like the above-described example. The surface of the recess 4B facing the first electrode 1 may be formed in, e.g., a dome shape such that the surface gradually bulges in a curved surface form in the direction toward the center of the recess 4B.

In the above-described manner, by changing the shape of the surface facing the first electrode 1, of the recess 4A or 4B for forming the space 5 between the insulating layer 3 and the first electrode 1, uneven distance is set between the first electrode 1 and the surface of the recess 4A or 4B facing the first electrode 1. Thereby, a desired characteristic can be obtained as the characteristic of the capacitance Cv as a function of the pressure applied to the pressure detecting chip 10A or 10B.

As with the case of the above-described pressure detecting chip 10, a desired characteristic can be obtained as the characteristic of the capacitance Cv as a function of the writing pressure applied to the pressure detecting chip 10A or 10B also by giving a variation to the thickness t of the first electrode 1, the modulus of elasticity, and elasticity characteristic of the elastic member 22, or the engagement relationship (e.g., the shape or form of abutting or interfacing) between the elastic member 22 and the first electrode 1.

Specifically, the shape of the tip of the small-diameter part 112b of the ferrite core 112, which engages with the elastic member 22, may be changed among, e.g., a curved surface shape such as a spherical surface shape, a non-flat surface shape such as a sharpened shape, or a flat surface shape. Thereby, the way the first electrode 1 is bent toward the space 5 in response to pressure applied to the pressure detecting chip 10, 10A, or 10B is varied. Also, by changing the shape of the tip of the small-diameter part 112b of the ferrite core 112, which engages with the elastic member 22, to any of various shapes as described above, the change characteristic of the capacitance Cv of the pressure detecting chip 10 as a function of applied pressure can be varied.

Second Embodiment

FIGS. 9A-9C are diagrams for explaining a position indicator 100A of a second embodiment. The position indicator 100A of the second embodiment is a position indicator for a position detecting device included in electronic apparatus such as a cell-phone terminal similar to that of the first embodiment. The same parts as those in the position indicator 100 of the above-described first embodiment are given the same reference symbols and description thereof is omitted.

FIG. 9A shows a sectional view of the position indicator 100A of the second embodiment at the part corresponding to the sectional view along line A-A in FIG. 1A. FIG. 9B is a perspective view of a configuration example of a pressure sensing semiconductor device 113A in the position indicator 100A of the second embodiment. FIG. 9C is a sectional view along line E-E in FIG. 9B.

In the position indicator 100A of the second embodiment, the case 101 and the pen tip sleeve 104 are configured similarly to the first embodiment. In the second embodiment, the configuration of the position indicator main body housed in the case 101 forming a housing is different from that in the above-described first embodiment.

Specifically, a position indicator main body 110A of the second embodiment is composed of the pressure sensing semiconductor device 113A, a ferrite core 112A of a magnetic material as a rod-shaped member around which the position indication coil 111 is wound, a pen tip 106 as a protruding member, the terminal plates 114 and 115, the semi-fixed adjustment capacitor 116, the adjustment capacitors 117a, 117b, 117c, and 117d, and a coupling member 118. In the second embodiment, a package 20A of the pressure sensing semiconductor device 113A is so configured as to hold the ferrite core 112A near its bottom surface 20Ab and to allow the pen tip 106 formed of, e.g., resin to be fitted into a recessed hole 23A to be described later.

In the second embodiment, the ferrite core 112A has a circular column shape with a constant diameter and the position indication coil 111 is wound around it. One side of the ferrite core 112A in the center line direction (axis direction) is fitted into a recess 21Ad provided on the side of the bottom surface 20Ab of the package 20A of the pressure sensing semiconductor device 113A. The other side of the ferrite core 112A in the center line direction is fitted into and coupled with the coupling member 118 formed of, e.g., resin. The coupling member 118 holds the terminal plates 114 and 115 similarly to the package 20 of the above-described pressure sensing semiconductor device 113. The coupling member 118 is a circular columnar member having an outer diameter almost equal to the inner diameter of the first case 102 and is held by the first case 102.

Between the terminal plate 114 and the terminal plate 115, the semi-fixed adjustment capacitor 116 and the adjustment capacitors 117a, 117b, 117c, and 117d are disposed as with the first embodiment. The terminal plate 114 and the terminal plate 115 are held by the trenches 103a and 103b made in the inner wall surface of the second case 103 and housed in the case 101 as with the first embodiment.

The pressure sensing semiconductor device 113A of the second embodiment may have the same configuration as that of the pressure sensing semiconductor device 113 of the first embodiment. However, in this example, it has a configuration shown in FIGS. 9B and 9C.

Specifically, the package 20A of the pressure sensing semiconductor device 113A of the second embodiment is configured by a package member 21A formed of a resin member having elasticity, specifically, e.g., silicone rubber, and does not have the elastic member 22 independently disposed in the package member 21A.

In this package member 21A, the recessed hole 23A that corresponds to the communication hole 23 of the above-described pressure sensing semiconductor device 113 and has a predetermined sectional shape, specifically, e.g., a circular shape, is formed. Furthermore, as shown in FIG. 9C, projections 27a and 27b in the form of an O-ring for holding the pen tip 106 in the form of a round rod are provided on the inner wall surface of this recessed hole 23A. Specifically, the inner diameter of the recessed hole 23A is set equal to or slightly larger than the diameter of the abutting part of the pen tip 106 in the form of a round rod. The inner diameter of the projections 27a and 27b in the form of an O-ring is so selected as to be smaller than the diameter of the abutting part of the pen tip 106.

Therefore, the pen tip 106 is held by the projections 27a and 27b when being guided by a taper part 21Ac made on the opening part side of the package member 21A (on the side of a top surface 20Aa) to be inserted into the recessed hole 23A. However, the pen tip 106 is not fixed in the recessed hole 23A and can be pulled out from the recessed hole 23A with a predetermined force. Therefore, the pen tip 106 can be easily replaced. In the second embodiment, the pen tip 106, which is the protruding member, serves also as the pressing member that transmits pressure to the package member 21A as the pressure transmitting member.

The first electrode 1 of the pressure detecting chip 10 is connected to a first lead terminal 24A formed of a conductor by a gold wire 33 and the second electrode 2 is connected to a second lead terminal 25A formed of a conductor. In the second embodiment, these first and second lead terminals 24A and 25A are so led out as to be perpendicular to the top surface 20Aa and the bottom surface 20Ab of the package 20A as shown in FIGS. 9B and 9C. The other configuration of the pressure sensing semiconductor device 113A is the same as that of the pressure sensing semiconductor device 113.

Although not shown in the diagram, the first lead terminal 24A and the second lead terminal 25A of the pressure sensing semiconductor device 113A of the second embodiment are electrically connected to the terminal plates 114 and 115 by a gold wire or the like. Furthermore, one end and the other end of the position indication coil 111 wound around the ferrite core 112A are also electrically connected to the terminal plates 114 and 115.

In the second embodiment, the pressure sensing semiconductor device 113A is disposed at a position close to the pen tip 106 and thus writing pressure can be detected with high sensitivity. Furthermore, in the pressure sensing semiconductor device 113A used in the position indicator 100A of the second embodiment, the package 20A is configured by the package member 21A functioning as the pressure transmitting member. Therefore, the structure of the pressure sensing semiconductor device can be made very simple.

Third Embodiment

In the position indicator 100 of the above-described first embodiment, the position indicator main body 110 has a circuit configuration composed only of the resonant circuit of the position indication coil and the capacitors and thus can be made as a unit. However, the position indicator needs to have a signal processing circuit including an integrated circuit (IC) in some cases depending on the configuration of the position detecting device that is electromagnetically coupled to this position indicator. In such a case, the position indicator generally includes a printed wiring board, on which a signal processing circuit is disposed.

A position indicator of a third embodiment includes a printed wiring board within a case. Furthermore, a pressure sensing semiconductor device to detect writing pressure is so disposed as to be fixed to the printed wiring board.

FIGS. 10A-10C are diagrams for explaining a position indicator 100B of the third embodiment. The position indicator 100B of the third embodiment is a position indicator for a position detecting device included in an electronic apparatus such as a cell-phone terminal similar to that of the first embodiment. The same parts as those in the position indicator 100 of the above-described first embodiment are given the same reference numerals and description thereof is omitted.

FIG. 10A shows a sectional view of the position indicator 100B of the third embodiment at the part corresponding to the sectional view along line A-A in FIG. 1A. FIG. 10B is a diagram showing a configuration example of an attachment part between a pressure sensing semiconductor device 113B and a printed wiring board 300 in the position indicator 100B of the third embodiment. FIG. 10C is a sectional view along line F-F in FIG. 10B.

A case 101B of the position indicator 100B of the third embodiment is composed of a first case 102B and a second case 103B and is formed into a bottomed cylindrical shape by concentrically combining both of the cases similarly to the case 101 of the position indicator 100 of the first embodiment.

In the third embodiment, trenches 103Ba and 103Bb are formed in the second case 103B along the axis direction. The widthwise end parts of the printed wiring board 300 are fitted into these trenches and the printed wiring board 300 is housed and disposed in the case 101B. The printed wiring board 300 abuts against the end part (not shown) opposite to the pen tip side of the trenches 103Ba and 103Bb of the second case 103B along the axis direction, so that its axial movement is limited when force if received from the pen tip side.

A position indicator main body 110B of the third embodiment does not have a one-unit configuration like that of the above-described first embodiment. The position indicator main body 110B of the third embodiment is composed of the printed wiring board 300, the pressure sensing semiconductor device 113B, a pressing member 120, the position indication coil 111, a ferrite core 112B, a pen tip holder 130, and a pen tip 131 forming the protruding member.

As shown in FIG. 10B, the pressure sensing semiconductor device 113B is attached to an end surface 300a on the pen tip side of the printed wiring board 300. FIG. 10C is an enlarged sectional view showing a configuration example of the pressure sensing semiconductor device 113B used in the position indicator main body 110B of the third embodiment.

The pressure sensing semiconductor device 113B of this example has the same configuration as that of the pressure sensing semiconductor device 113 used in the first embodiment and has a configuration using the elastic member 22 composed of, e.g., silicone rubber as the pressure transmitting member. The same parts as those in the above-described pressure sensing semiconductor device 113 are given the same reference numerals in FIG. 10C and description thereof is omitted.

However, the pressure sensing semiconductor device 113B of this example is different from the pressure sensing semiconductor device 113 used in the first embodiment in the method for leading out terminal parts and in that a package member forming a package 20B is divided into two members, i.e., a first package member 21UP and a second package member 21DW, in the direction perpendicular to the surface 1a of the first electrode 1 of the pressure detecting chip 10 as shown in FIG. 10C.

In this example, the first package member 21UP is configured as a member that has the elastic member 22 and in which the communication hole 23 is formed. Furthermore, a taper part 21c is formed on the opening part side of the communication hole 23.

The second package member 21DW is so configured as to seal the pressure detecting chip 10, with the side of the surface 1a of the first electrode 1 exposed, and as to lead out lead terminals 24B and 25B.

One package 20B is formed by monolithically connecting the first package member 21 UP and the second package member 21DW configured in the above-described manner by, e.g., adhesive or pressure welding in such a manner that the elastic member 22 abuts on the surface 1a of the first electrode 1 of the pressure detecting chip 10.

In the pressure sensing semiconductor device 113B of this example, the size of the package 20B is set slightly smaller compared with the case of the example of FIG. 1. Furthermore, as shown in FIGS. 10B and 10C, in the pressure sensing semiconductor device 113B of this example, the lead terminal 24B connected to the first electrode 1 of the pressure detecting chip 10 and the lead terminal 25B connected to the second electrode 2 of the pressure detecting chip 10 are led out, on the side of one side surface 20Bd of the package 20B, from the package member 21DW in the direction perpendicular to the side surface 20Bd. Then, these led-out lead terminals 24B and 25B have such a shape as to be orthogonally bent, as shown in the diagram, so as to extend along the direction perpendicular to a bottom surface 20Bb of the package 20B.

Furthermore, on the side of another side surface 20Be opposite to the above-described side surface 20Bd of the package 20B, a dummy terminal 26 that is not electrically connected to the pressure detecting chip 10 is led out from the second package member 21DW. The dummy terminal 26 also has such a shape as to be orthogonally bent as shown in the diagram. The dummy terminal 26 has a wide width.

In this case, the orthogonally-bent parts of the lead terminals 24B and 25B led out from the side of the side surface 20Bd of the package 20B and the orthogonally-bent part of the dummy terminal 26 led out from the side of the other side surface 20Be are opposed to each other. The distance between them is so selected as to be almost equal to the thickness d of the printed wiring board 300 as shown in FIGS. 10B and 10C.

A projection 28 for alignment is formed at, e.g., the center part of the bottom surface 20Bb of the package 20B of the pressure sensing semiconductor device 113B. Meanwhile, as shown in FIG. 10B, a recessed hole 301 into which the projection 28 is fitted is made in the end surface 300a of the printed wiring board 300. The projection 28 may have any of shapes for alignment, such as a circular column shape, rectangular column shape, circular cone shape, circular truncated cone shape, truncated pyramid shape, and dome shape. It is obvious that the recessed hole 301 is formed into the shape corresponding to the shape of the projection 28.

The position at which the recessed hole 301 is formed in the end surface 300a of the printed wiring board 300 is selected such that the lead terminals 24B and 25B of the pressure sensing semiconductor device 113B are electrically connected to printed wiring patterns 302 and 303, respectively, provided on one surface 300b of the printed wiring board 300 when the printed wiring board 300 is sandwiched between the lead terminals 24B and 25B and the dummy terminal 26 of the pressure sensing semiconductor device 113B and the projection 28 of the pressure sensing semiconductor device 113B is fitted into the recessed hole 301.

The other configuration of the pressure sensing semiconductor device 113B is the same as that of the pressure sensing semiconductor device 113.

As shown in FIG. 10B, the pressure sensing semiconductor device 113B of this example is so disposed that the lead terminals 24B and 25B and the dummy terminal 26 sandwich the printed wiring board 300 along the thickness direction thereof, while the bottom surface 20Bb of the package 20B abuts against the end surface 300a of the printed wiring board 300. In this case, as shown in FIG. 10B, the projection 28 of the package 20B of the pressure sensing semiconductor device 113B is inserted and fitted into the recessed hole 301 and thereby the pressure sensing semiconductor device 113B is aligned with the end surface 300a of the printed wiring board 300.

The printed wiring patterns 302 and 303 provided on one surface 300b of the printed wiring board 300 are fixed to the first lead terminal 24B and the second lead terminal 25B, respectively, by soldering. Furthermore, although not shown in the diagram, similarly, the dummy terminal 26 is soldered to a dummy wiring pattern on the surface opposite to the surface 300b of the printed wiring board 300. Thereby, the pressure sensing semiconductor device 113B is firmly fixed to the printed wiring board 300. In this manner, the pressure sensing semiconductor device 113B is fixedly attached to the printed wiring board 300 in such a manner as to be capable of receiving pressing force from the pen tip 131 along the axis direction of the case 101B so as to change the capacitance Cv of the pressure detecting chip 10.

In the third embodiment, the ferrite core 112B is a rod-shaped member composed of a magnetic material and has a circular column shape in this example. The position indication coil 111 is wound around the ferrite core 112B to form the inductance element. One end and the other end of the position indication coil 111 are connected to printed patterns on the printed wiring board 300 although not shown in the diagram. Furthermore, a recess 112Ba is formed at the center part of the end surface of the ferrite core 112B on the pen tip side in the axis direction and a recess 112Bb is formed at the center part of the end surface on the opposite side to the pen tip side in the axis direction.

The pen tip holder 130 is configured by an elastic member that has a circular column shape and is formed of resin having elasticity or the like, specifically, e.g., silicone rubber. At the center part of the end surface of the pen tip holder 130 on the pen tip side in the axis direction, a recess 130a is made to fittedly receive the rod-shaped pen tip 131 formed of, e.g., resin as the protruding member. In addition, at the center part of the end surface on the opposite side to the pen tip side in the axis direction, a projection 130b to be fitted into the recess 112Ba of the ferrite core 112B for coupling with the ferrite core 112B is provided.

In this case, the pen tip holder 130 is fixed to the ferrite core 112B by an adhesive or the like, with its projection 130b fitted to the recess 112Ba of the ferrite core 112B. On the other hand, the pen tip 131 is merely press-fitted into the recess 130a of the pen tip holder 130 and can be pulled out from the pen tip holder 130 to be replaced. The pen tip 131 is detachably covered by the preference adjusting member 105 similarly to the above-described embodiment.

On the opposite side to the pen tip side of the ferrite core 112B in the axis direction, a coupling member 140 that is formed of, e.g., resin and has a circular column shape is provided. At the center part of the end surface of the coupling member 140 on the side of the ferrite core 112B, a projection 140a fitted to the recess 112Bb of the ferrite core 112B is formed. The coupling member 140 is bonded and fixed to the ferrite core 112B by, e.g., an adhesive, with the recess 112Bb of the ferrite core 112B fitted to the projection 140a of the coupling member 140.

At the center part of the end surface of the coupling member 140 on the opposite side to the ferrite core 112B, a projection 140b fitted into the pressing member 120 is provided. In this example, the pen tip 131, the ferrite core 112B, and the coupling member 140 form the rod-shaped member that transmits pressure corresponding to applied writing pressure to the pressing member 120.

The pressing member 120 has a circular column shape composed of, e.g., resin and has a fitting recessed hole 120c into which the projection 140b of the coupling member 140 is fitted. The projection 140b of the coupling member 140 is fitted into the fitting recessed hole 120c of the pressing member 120 and the coupling member 140 and the pressing member 120 are monolithically coupled.

Projections 120a and 120b are formed on the circumferential side part of the pressing member 120. The projections 120a and 120b are inserted in notch parts 121a and 121b that are formed in the side surface of a holder 121 bonded to the inner wall surface of the first case 102B. The notch parts 121a and 121b have a predetermined length along the axis direction of the case 101B. The pressing member 120 is movably housed in the cylindrical holder 121 fixed to the first case 102B, and is movable along the axis direction of the case 101B based on the fitting of the projections 120a and 120b into the notch parts 121a and 121b, respectively. Therefore, the pressing member 120 can move along the axis direction of the case 101B in the range of the length of the notch parts 121a and 121b of the holder 121, with the projections 120a and 120b inserted in the notch parts 121a and 121b.

The pressing member 120 is further provided with a projection 120d, which is inserted in the communication hole 23 of the pressure sensing semiconductor device 113B to press the first electrode 1 of the pressure detecting chip 10 toward the space 5.

The inner diameter of the penetrating hole 21b forming the communication hole 23 is set slightly larger than the diameter of the projection 120d of the pressing member 120 inserted into this communication hole 23 and the penetrating hole 21b is so configured as to guide the insertion of the pressing member 120 together with the taper part 21c. Furthermore, the inner diameter of the recessed hole 22a of the elastic member 22 forming the communication hole 23 is set slightly smaller than the diameter of the projection 120d and the recessed hole 22a forms the holder for the pressing member 120.

The position indicator 100B is configured in the above-described manner. Thus, when the user holding the position indicator 100B in the user's hand brings the position indicator 100B into contact with, e.g., the display screen of an electronic apparatus and presses the display screen with the position indicator 100B, the pen tip 131 receives force along the axis direction of the case 101B and thereby the projection 120*d* of the pressing member 120 presses the first electrode 1 of the pressure detecting chip 10 of the pressure sensing semiconductor device 113B toward the space 5. Therefore, the pressing force corresponding to the writing pressure applied to the pen tip 131 is applied to the first electrode 1 of the pressure detecting chip 10 of the pressure sensing semiconductor device 113B and the capacitance Cv of the pressure detecting chip 10 changes depending on the writing pressure.

In the case of this example, on the printed wiring board 300, an integrated circuit (IC) 305 forming a signal processing circuit is provided besides adjustment capacitors 304. As described below, the IC 305 carries out processing related to the capacitance Cv that corresponds to the writing pressure detected by the pressure detecting chip 10 of the pressure sensing semiconductor device 113B.

In the example of FIGS. 10B and 10C, in the pressure sensing semiconductor device 113B, the elastic member 22 as the pressure transmitting member is provided on the side of the first package member 21UP. However, the elastic member 22 may be provided on the side of the second package member 21DW. In this case, it is also possible that, e.g., a film-shaped member that is composed of a silicone resin and has elasticity is disposed as the elastic member 22 in front of the first electrode 1 of the pressure detecting chip 10 and the elastic member 22 is pressed by the projection 120*d* of the pressing member 120. Furthermore, in this example, the printed wiring board 300 is disposed in the position indicator 100B and the integrated circuit (IC) 305 forming a signal processing circuit and so forth is disposed on the printed wiring board 300 besides the adjustment capacitors 304. However, to achieve further space saving in or size reduction of the position indicator, these electronic parts and the pressure sensing semiconductor device 113B may be integrated to be housed in one package.

Figure 11:
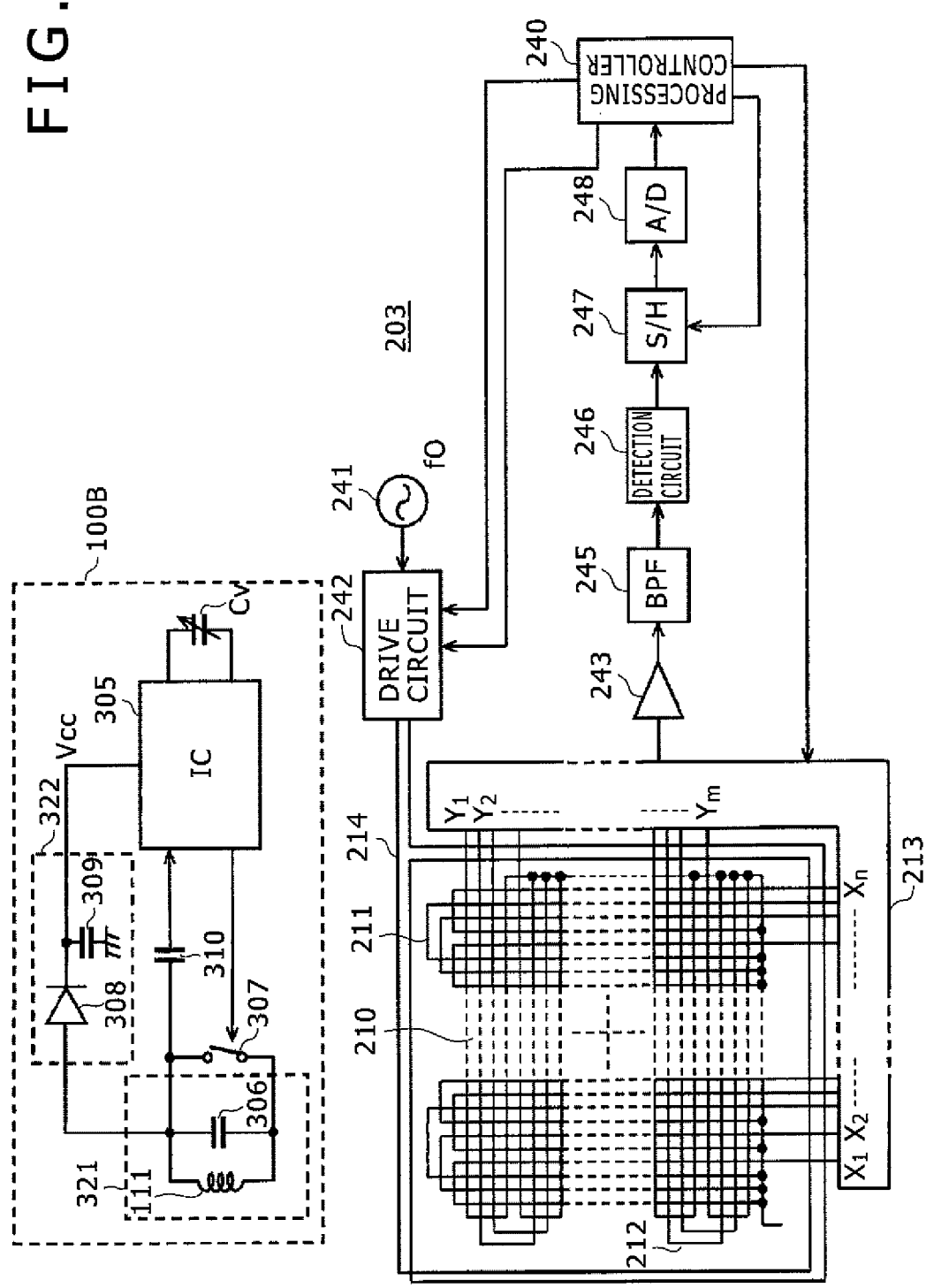
FIG. 11 is a diagram for explaining a configuration example of another example of the position detecting device used together with an embodiment of the position indicator according to this invention.

Circuit Configuration for Position Detection and Writing Pressure Detection in Third Embodiment FIG. 11 is a diagram showing the equivalent circuit of the position indicator 100B of the third embodiment and a circuit configuration example of a position detecting device 203 that performs position detection and writing pressure detection by electromagnetic induction coupling with the position indicator 100B.

In the position detecting device 203 of this example of FIG. 11, as with the position detecting device 202 shown in FIG. 5, the position detection coil 210 obtained by stacking the X-axis-direction loop coil group 211 and the Y-axis-direction loop coil group 212 is formed. In addition, the selection circuit 213 that sequentially selects one loop coil in two loop coil groups 211 and 212 is also similarly provided. However, the system composed of the position indicator 100B and the position detecting device 203 exemplified in FIG. 11 is different from the already-described system composed of the position indicator 100 and the position detecting device 202 in that the position indicator 100B includes a signal control circuit configured by an IC circuit, and a drive voltage to drive the IC circuit is acquired from an excitation signal transmitted from an exciting coil 214 included in the position detecting device 203. The following explanation with reference to FIG. 11 is based on the assumption that the loop coil groups 211 and 212 of the position detecting device 203 are used only for reception of an electromagnetic coupling signal from the position indicator 100B, as one example. However, the signal control circuit included in the position indicator 100B may also be driven by electromagnetic coupling between the position indicator 100B and the loop coil groups 211 and 212 instead of by the exciting coil 214. Furthermore, the loop coil groups 211 and 212 may transmit a signal of predetermined control data and so forth to the signal control circuit included in the position indicator 100B.

In the position detecting device 203 of this example of FIG. 11, the exciting coil 214 is so disposed as to surround the position detection coil 210. Although the number of turns of the exciting coil 214 is two in FIG. 11, actually the number of turns may be larger, specifically, e.g., eight to ten turns. As shown in FIG. 11, the exciting coil 214 is connected to a drive circuit 242 and the drive circuit 242 is connected to an oscillation circuit 241 that oscillates at a frequency f0.

The drive circuit 242 is controlled by a processing controller 240 configured by a microcomputer. The processing controller 240, which controls the drive circuit 242, controls supply of an oscillation signal at the frequency f0 from the oscillation circuit 241 to the exciting coil 214 and controls signal transmission from the exciting coil 214 to the position indicator 1006.

The selection circuit 213 is controlled by the processing controller 240 to select one loop coil similarly to the above-described position detecting device 202. An induced voltage generated in the loop coil selected by the selection circuit 213 is amplified by a receiving amplifier 243 and the amplified voltage is supplied to a band-pass filter 245, so that only the component of the frequency f0 is extracted. The band-pass filter 245 supplies the extracted component to a detection circuit 246.

The detection circuit 246 detects the component of the frequency f0 and supplies a DC signal based on the detected component of the frequency f0 to a sample/hold circuit 247. The sample/hold circuit 247 holds a voltage value at predetermined timing of the output signal of the detection circuit 246, specifically at predetermined timing in the reception period, and sends it out to an A/D conversion circuit 248. The A/D conversion circuit 248 converts the analog output of the sample/hold circuit 247 to a digital signal and outputs it to the processing controller 240. The processing controller 240 supplies the signal of the predetermined timing to the sample/hold circuit 247.

Furthermore, the processing controller 240 determines whether or not the digital signal from the A/D conversion circuit 248 has a value surpassing a predetermined threshold value to determine whether or not the loop coil selected by the selection circuit 213 is the loop coil at the position indicated by the position indicator 1006.

Moreover, as described later, separately from the detection of the position indicated by the position indicator 1006, the processing controller 240 detects intermittent transmission of a signal from the position indicator 100B as a digital signal of several bits, specifically, e.g., eight bits, to detect writing pressure.

The position indicator 100B has a circuit configuration shown by the surrounding dotted line in FIG. 11. Specifically, a resonant circuit 321 is configured by the position indication coil 111 as the inductance element and a capacitor 306 disposed on the printed wiring board 300. Furthermore, a switch 307 is connected in parallel to the resonant circuit 321. The switch 307 is so configured as to be on/off-controlled by the IC 305. The position indication coil 111 is wound around the rod-shaped member composed of a magnetic material.

The IC 305 is so configured as to operate based on a power supply Vcc produced by a rectification circuit (power supply circuit) 322 composed of a diode 308 and a capacitor 309. The rectification circuit rectifies an AC signal, which is received in the resonant circuit 321, configured by the position indication coil 111 and the capacitor 306, from the position detecting device 203 based on electromagnetic induction. The IC 305 is connected to the resonant circuit 321 via a capacitor 310 and monitors the operating condition of the resonant circuit 321. By monitoring the operating condition of the resonant circuit 321, the IC 305 detects the condition of electromagnetic coupling with the exciting coil 214 of the position detecting device 203 or, although description is omitted in this example, a signal of control data and so forth transmitted from the two loop coil groups 211 and 212 of the position detecting device 203, to carry out desired operation control.

Furthermore, the capacitor (capacitance Cv) configured by the pressure detecting chip 10 is connected to the IC 305 and the variable capacitance Cv depending on writing pressure can be detected. The IC 305 detects the writing pressure in the position indicator 100B from the value of the variable capacitance Cv. Then, the IC 305 converts the detected writing pressure to a digital signal of, e.g., eight bits and controls the switch 307 by this digital signal corresponding to the writing pressure. In the above circuit configuration, the capacitor configured by the pressure detecting chip 10 does not need to be included in the resonant circuit 321. All the elements other than the position indication coil 111 and the variable capacitance Cv configured by the pressure detecting chip 10 are disposed on the printed wiring board 300.

Position detection operation and writing pressure detection operation of the position indicator 100B and the position detecting device 203 configured in the above-described manner will be described below.

First, the processing controller 240 drives the drive circuit 242 to transmit a signal from the exciting coil 214 to the position indicator 100B for a predetermined time. In addition, the processing controller 240 directs the selection circuit 213 to sequentially select one loop coil in the X-axis-direction loop coil group 211 to obtain the X-coordinate value of the position indicated by the position indicator 1006.

Next, the processing controller 240 drives the drive circuit 242 to transmit a signal from the exciting coil 214 to the position indicator 100B for a predetermined time. In addition, the processing controller 240 directs the selection circuit 213 to sequentially select one loop coil in the Y-axis-direction loop coil group 212 to obtain the Y-coordinate value of the position indicated by the position indicator 1006.

After the position indicated by the position indicator 100B is detected in the above-described manner, the processing controller 240 detects pen pressure information of eight bits from the position indicator 1006 by such a manner that electromagnetic transmission and reception are performed continually to receive the eight bit information bit by bit eight times, at timing similar to that in the coordinate detection. At this time, in accordance with the detected coordinate value, the selection circuit 213 selects the loop coil closest to the position indicator 100B (either an X-axis-direction loop coil or a Y-axis-direction loop coil may be selected) to receive the writing pressure signal.

On the other hand, the IC 305 of the position indicator 100B converts writing pressure obtained corresponding to the capacitance Cv of the pressure detecting chip 10 to the digital signal of eight bits and carries out on/off-control of the switch 307 by this digital signal of eight bits in synchronization with the signal transmission/reception to/from the position detecting device 203. When the switch 307 is in the off-state, the resonant circuit 321 can return the signal transmitted from the position detecting device 203 back to the position detecting device 203 so that the loop coil of the position detecting device 203 receives this signal. In contrast, when the switch 307 is in the on-state, the resonant circuit 321 is in the operation-prohibited state. Thus, the signal is not returned from the resonant circuit 321 to the position detecting device 203 and the loop coil of the position detecting device 203 does not receive the signal.

The processing controller 240 of the position detecting device 203 receives the digital signal of eight bits corresponding to the writing pressure by checking whether or not the received signal is present eight times, to thereby detect the writing pressure information from the position indicator 100B.

Fourth Embodiment

FIGS. 12A and 12B are diagrams for explaining a configuration example of a position indicator 100C of a fourth embodiment. The position indicator 100C of the fourth embodiment is a modification example of the first embodiment. The same parts as those in the position indicator 100 of the above-described first embodiment are given the same reference numerals in FIG. 12 and description thereof is omitted.

FIG. 12A shows the outline of the whole of the position indicator 100C of this embodiment and shows axial half of the position indicator 100C as a sectional view. FIG. 12B is a sectional view (enlarged view) along line G-G in FIG. 12A. FIG. 12C is a sectional view along line H-H in FIG. 12B.

In the position indicator 100C of the fourth embodiment, of the components of a position indicator main body 110C housed in a case 101C, mainly a ferrite core 112C has a different shape. Specifically, as shown in FIG. 12B, the ferrite core 112C of the position indicator main body 110C of the position indicator 100C of the fourth embodiment is not one having a solid circular column shape but a rod-shaped member of a magnetic material that has a cylindrical shape whose center part is a hollow part 112Ca defined as a penetrating hole. The position indication coil 111 as the inductance element is wound around the outer circumferential part of the ferrite core 112C.

Therefore, the ferrite core 112C has a diameter larger than that of a pressure sensing semiconductor device 113C. Thus, differently from the first embodiment, the pressure sensing semiconductor device 113C is not necessarily coupled to the ferrite core 112C.

The ferrite core 112C is radially held by a portion of a first case 102C and the position of the pen tip side thereof in the axis direction of the case 101C is restricted by the wall part 104c of the pen tip sleeve 104. Furthermore, the ferrite core 112C engages with the end part of a second case 103C, which restricts the position of the side of the ferrite core 112C opposite to the pen tip side in the axis direction of the case 101C.

In this embodiment, the pressure sensing semiconductor device 113C has almost the same configuration as that of the pressure sensing semiconductor device 113 of the first embodiment except for that it does not have the configuration for holding the ferrite core 112C. Specifically, the pressure sensing semiconductor device 113C of the fourth embodiment has a configuration in which the terminal plates 114 and 115 are held on the side of the bottom surface 20b of its package 20. Furthermore, the position of the pressure sensing semiconductor device 113C in the axis direction of the case 101C is locked so that pressure from the pen tip side can be received, based on abutment of the axial end parts of the terminal plates 114 and 115 with trenches 103Ca and 103Cb and abutment of the bottom surface 20b of the pressure sensing semiconductor device 113C with a step part of the second case 103C.

The fourth embodiment includes a core body 107 that penetrates the hollow part 112Ca of the ferrite core 112C and is composed of, e.g., resin. One end side of the core body 107 protrudes from the opening part 104b of the pen tip sleeve 104 to the external to form the protruding member. In addition, the other end side is inserted in the communication hole 23 of the pressure sensing semiconductor device 113C to form the pressing member. Therefore, in this example, one end side of the core body 107 forms the protruding member and the other end side forms the pressing member. Furthermore, the core body 107 forms the rod-shaped member that transmits pressure corresponding to applied writing pressure to the elastic member 22 as the pressure transmitting member.

In this example, the inner diameter of the penetrating hole 21b of the package member 21 forming the communication hole 23 is set slightly larger than the diameter of the part of the other end part of the core body 107 abutting against the penetrating hole 21b. In addition, the inner diameter of the recessed hole 22a is set slightly smaller than the diameter of the part of the other end part of the core body 107 abutting against the recessed hole 22a. Due to this feature, guiding of the other end part of the core body 107 to the inside of the pressure sensing semiconductor device 113C is facilitated by the taper part 21c and the penetrating hole 21b. In addition, the recessed hole 22a forms the holder to hold the core body 107 so that the core body 107 inserted in the pressure sensing semiconductor device 113C may be prevented from easily dropping off. The core body 107 can be released from the pressure sensing semiconductor device 113C when pulled out with predetermined force. Thus, the core body 107 can be easily replaced.

In the position indicator 100C of the fourth embodiment, the ferrite core 112C of a magnetic material forms the rod-shaped member that is formed into a hollow cylindrical shape having a center hole (penetrating hole), and thus has a relatively thick (larger-diameter) shape. Thus, as shown in FIG. 12A, the position indicator 100C correspondingly has a thick pen shape as a whole as compared with the position indicator 100 of the first embodiment. However, the case 101C is different from the case 101 of the first embodiment only in diameter and is obtained by concentrically combining the first case 102C and the second case 103C. Furthermore, the configuration is the same as that of the first embodiment in that the terminal plates 114 and 115 are fitted in and held by the trenches 103Ca and 103Cb formed in the inner wall of the second case 103C as shown in FIG. 12C.

Fifth Embodiment

Figure 13A:
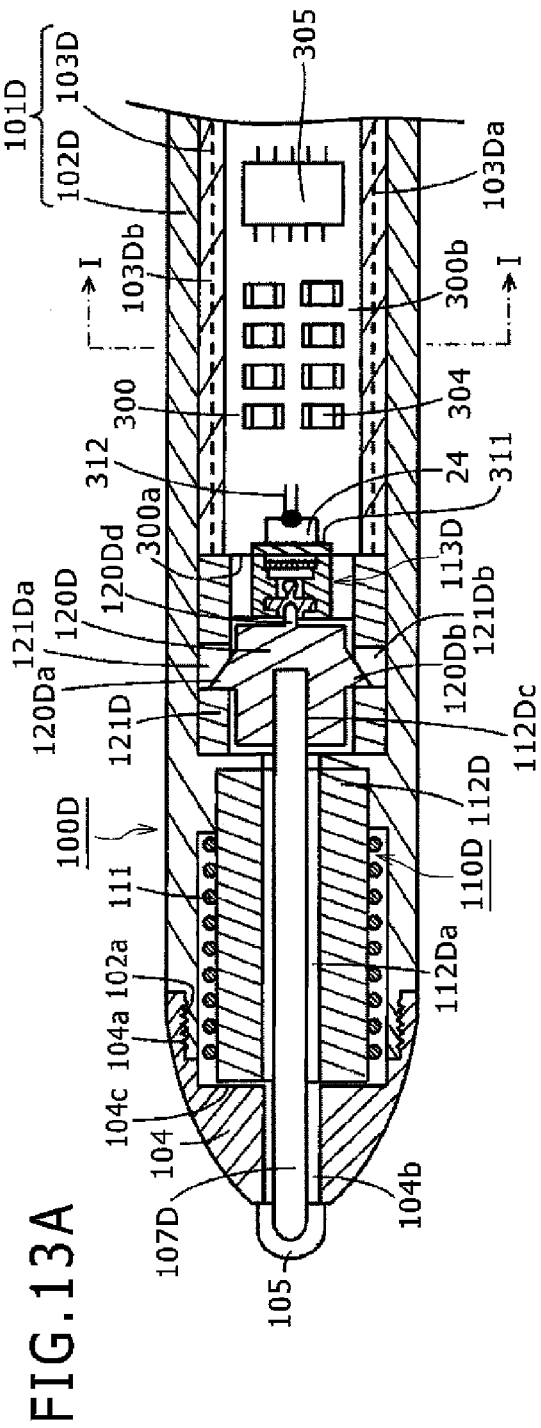
FIGS. 13A and 13B are diagrams for explaining a configuration example of a position indicator of a fifth embodiment according to this invention.
Figure 13B:
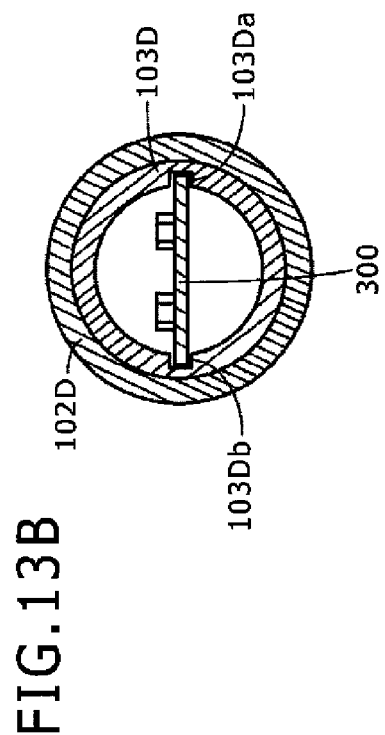

FIGS. 13A and 13B are diagrams for explaining a configuration example of a position indicator 100D of a fifth embodiment. The position indicator 100D of the fifth embodiment is a modification example of the third embodiment. The same parts as those in the position indicator 100B of the above-described third embodiment are given the same reference numerals in FIG. 13 and description thereof is omitted.

Similarly to the relationship between the fourth embodiment and the first embodiment, the fifth embodiment is equivalent to the configuration obtained by changing the configuration of the third embodiment in that the shape of the ferrite core is changed from the solid shape to a hollow cylindrical shape having a penetrating hole and a rod-shaped core body is inserted in the hollow part of the ferrite core.

FIG. 13A is a partial sectional view of the position indicator 100D of the fifth embodiment. This is a diagram corresponding to the sectional view (enlarged view) along line G-G in FIG. 12A. FIG. 13B is a sectional view along line I-I in FIG. 13A.

In the position indicator 100D of the fifth embodiment, of the components of a position indicator main body 110D housed in a case 101D, a ferrite core 112D composed of a magnetic material forms the rod-shaped member that has a center hole (penetrating hole). Specifically, as shown in FIG. 13A, the ferrite core 112D has a cylindrical shape whose center part is a hollow part 112Da defined as the penetrating hole.

A portion of a first case 102D radially holds the ferrite core 112D and restricts (defines) the position of the side of the ferrite core 112D opposite to the pen tip side in the axis direction of the case 101D. Furthermore, the position of the pen tip side in the axis direction of the case 101D is restricted by the wall part 104c of the pen tip sleeve 104.

The fifth embodiment includes a core body 107D penetrating the hollow part 112Da of the ferrite core 112D and one end side of the core body 107D protrudes from the opening part 104b of the pen tip sleeve 104 to the external to form the protruding member. The other end side is press-fitted into a pressing member 120D.

The pressing member 120D has a circular column shape and, on the side of the ferrite core 112D in the axis direction, has a fitting recessed hole 112Dc into which the other end side of the core body 107D is press-fitted. Furthermore, projections 120Da and 120Db are formed on the circumferential side part of the pressing member 120D. The projections 120Da and 120Db are inserted in notch parts 121Da and 121Db that are formed in the side surface of a holder 121D bonded to the inner wall surface of the first case 102D. The notch parts 121Da and 121Db have a predetermined length along the axis direction of the case 101D.

As shown in FIG. 13B, trenches 103Da and 103Db for fixing the printed wiring board 300 to the position indicator main body 110D are formed in the inner wall surface of a second case 103D of the case 101D. In the end surface 300a of the printed wiring board 300, a recess 311 to house a portion of the package of a pressure sensing semiconductor device 113D for alignment is formed by partially notching the end surface 300a.

The pressing member 120D is movably housed in the cylindrical holder 121D fixed to the first case 102D, and is movable along the axis direction of the case 101D based on the fitting of the projections 120Da and 120Db into the notch parts 121Da and 121Db, respectively. Therefore, the pressing member 120D can move along the axis direction of the case 101D in the range of the length of the notch parts 121Da and 121Db of the holder 121D, with the projections 120Da and 120Db inserted in the notch parts 121Da and 121Db.

The pressing member 120D is further provided with a projection 120Dd for pressing the first electrode 1 of the pressure detecting chip 10 of the pressure sensing semiconductor device 113D toward the space 5.

Figure 14A:
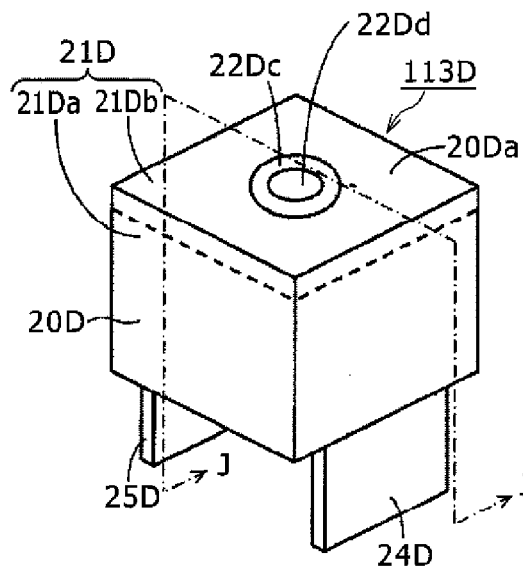
FIGS. 14A-14C are diagrams for explaining a configuration example of a device including a semiconductor element used for the position indicator of the fifth embodiment according to this invention.
Figure 14B:
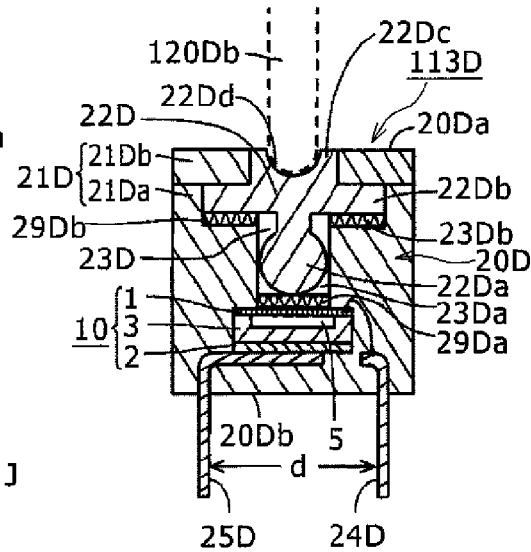
Figure 14C:
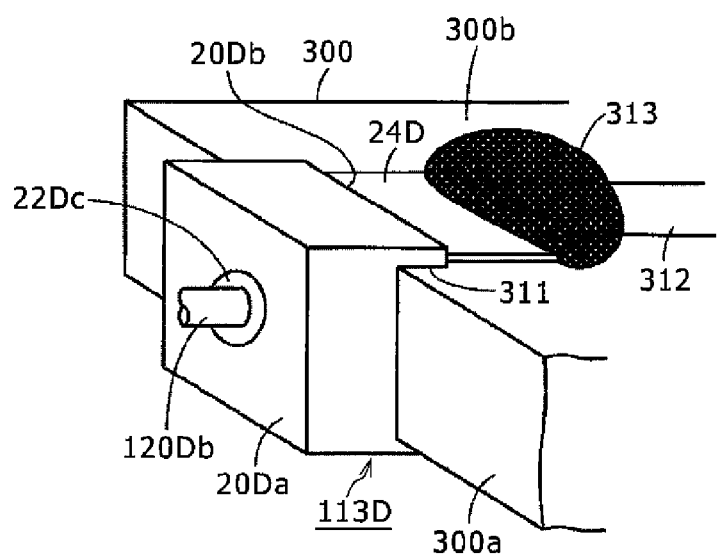

Although it is also possible for the pressure sensing semiconductor device 113D to have the same configuration as that of the third embodiment, i.e., the configuration of the pressure sensing semiconductor device 113B, it has a configuration shown in FIGS. 14A-14C in the fifth embodiment.

FIG. 14A is a perspective view of the pressure sensing semiconductor device 113D used in the fifth embodiment. FIG. 14B is a sectional view along line J-J in FIG. 14A. FIG. 14C is one example of a diagram showing the state in which the pressure sensing semiconductor device 113D is attached to the printed wiring board 300. The same parts as those in the above-described pressure sensing semiconductor device 113 are given the same reference numerals in FIG. 14 and description thereof is omitted.

As shown in FIGS. 14A and 14B, in the pressure sensing semiconductor device 113D of the fifth embodiment, a package 20D is composed of a package member 21D and pressure transmitting members (22D, 29Da, and 29Db). The package member 21D is composed of a main part 21Da and a lid part 21Db. Furthermore, a recess 23D is formed in the main part 21Da of the package member 21D as shown in FIG. 14B, and the pressure detecting chip 10 is so housed that the upper side of the first electrode 1 is exposed to the recess 23D. In the recess 23D made above the pressure detecting chip 10, a pressing projection 22Da forming the pressure transmitting member 22D is so housed as to face the first electrode 1.

In this example, the cushion member 29Da having predetermined elasticity is formed to adhere to the top surface of the first electrode 1 of the pressure detecting chip 10. The cushion member 29Da protects the first electrode 1 so that the first electrode 1 may be prevented from being damaged due to direct contact of the pressing projection 22Da of the pressure transmitting member 22D with the first electrode 1. In addition, the cushion member 29Da plays a role of elastically transmitting pressure applied by the projection 120Dd of the pressing member 120D via the pressure transmitting member 22D. The cushion member 29Da is a film-shaped elastic member formed of, e.g., silicone rubber. The modulus of elasticity and elasticity characteristic thereof are selected depending on the desired change characteristic of the capacitance Cv of the pressure detecting chip 10 as a function of applied pressure and the shock resistance characteristic against an unexpected pressure applied by the projection 120Dd of the pressing member 120D.

The pressure transmitting member 22D includes the pressing projection 22Da that abuts against the first electrode 1 of the pressure detecting chip 10 with the intermediary of the cushion member 29Da, a flange part 22Db, and a pressure-applied part 22Dc that is exposed to the outside of the package 20D and is flush with a top surface 20Da of the package 20D. The pressure-applied part 22Dc receives pressing force by the projection 120Dd of the pressing member 120D. In this example, the pressing projection 22Da of the pressure transmitting member 22D is formed into a spherical shape. Furthermore, the cushion member 29Db having predetermined elasticity is formed to adhere to the surface of the flange part 22Db on the side of the pressing projection 22Da. A semispherical recess 22Dd is formed in the pressure-applied part 22Dc in this example.

In this example, the pressure transmitting member 22D elastically transmits pressure applied via the core body 107D and the pressing member 120D to the first electrode 1 of the pressure detecting chip 10 owing to the existence of the cushion members 29Da and 29Db. Therefore, the pressure transmitting member 22D can be formed by a resin that does not have elasticity differently from the cushion members 29Da and 29Db. Alternatively, the pressure transmitting member 22D may be formed by a material having elasticity, specifically, e.g., silicone rubber, and the cushion members 29Da and 29Db may be given an elasticity characteristic to provide protection against an unexpected instantaneous pressure.

If the pressure transmitting member 22D is formed of an elastic body such as silicone rubber, the cushion members 29Da and 29Db can be omitted.

As shown in FIG. 14B, the recess 23D of the main part 21Da of the package member 21D has a recessed hole 23Da in which the pressing projection 22Da of the pressure transmitting member 22D is freely movably housed, and a step part 23Db with which the flange part 22Db of the pressure transmitting member 22D engages with the intermediary of the cushion member 29Db.

In this pressure sensing semiconductor device 113D, the pressure transmitting member 22D is mounted in the main part 21Da of the package member 21D in such a manner that the pressing projection 22Da of the pressure transmitting member 22D is inserted in the recessed hole 23Da of the recess 23D in the main part 21Da of the package member 21D, in which the pressure detecting chip 10 is housed, and the flange part 22Db of the pressure transmitting member 22D is engaged with the step part 23Db made in the main part 21Da of the package member 21D with the intermediary of the cushion member 29Db.

In this mounted state, the upper part of the pressure transmitting member 22D is sealed by the lid part 21Db of the package member 21D such that the pressure-applied part 22Dc of the pressure transmitting member 22D is flush with and exposed from the top surface 20Da of the package 20D.

In this example, the first lead terminal 24D connected to the first electrode 1 and the second lead terminal 25D connected to the second electrode 2 are led out from a bottom surface 20Db of the package 20D in the direction perpendicular to the bottom surface 20Db. In this case, the first lead terminal 24D and the second lead terminal 25D are so led out as to oppose and in parallel to each other with the intermediary of a gap corresponding to the thickness d of the printed wiring board 300.

Furthermore, as shown in FIG. 14C, the pressure sensing semiconductor device 113D is so disposed that the first and second lead terminals 24D and 25D sandwich the printed wiring board 300 along the thickness direction of the printed wiring board 300 in the state in which the bottom surface 20Db of the package 20D abuts against the end surface 300a of the printed wiring board 300.

In this case, in the end surface 300a of the printed wiring board 300, the recess 311 to house or receive at least a portion of the package 20D of the pressure sensing semiconductor device 113D is formed by partially notching the end surface 300a. The pressure sensing semiconductor device 113D of this example is aligned with the end surface 300a of the printed wiring board 300 by fitting the side of the bottom surface 20Db of the package 20D in the recess 311 formed in the end surface 300a of the printed wiring board 300.

In addition, a printed wiring pattern 312 provided on one surface 300b of the printed wiring board 300 and the first lead terminal 24D are electrically connected and fixed by a solder 313. Furthermore, although not shown in the diagram, similarly, a printed wiring pattern provided on the surface on the opposite side to the one surface 300b of the printed wiring board 300 and the second lead terminal 25D are fixed by soldering. If a signal processing circuit (IC or the like) is provided on the side of the one surface 300b of the printed wiring board 300, the printed wiring pattern to which the second lead terminal 25D is soldered is provided on the surface on the opposite side to the one surface 300b of the printed wiring board 300 and thus is connected to the printed wiring pattern on the side of the one surface 300b via a through-hole made in the printed wiring board 300 to be connected to the signal processing circuit.

As described above, in this example, the pressure sensing semiconductor device 113D is fitted into the recess 311 made in the end surface 300a of the printed wiring board 300. Accordingly, exactly as with the example of FIG. 10B, the pressure sensing semiconductor device 113D is easily aligned with the printed wiring board 300 and processing such as soldering can be carried out easily and surely.

Thus, in the pressure sensing semiconductor device 113D fixed to the printed wiring board 300, the tip of the projection 120Dd of the pressing member 120D presses the top surface of the pressure-applied part 22Dc of the pressure transmitting member 22D. In the pressure sensing semiconductor device 113D of this example, the tip of the projection 120Dd of the pressing member 120D is formed into a spherical shape and the recess 22Dd formed in the pressure-applied part 22Dc also has a shape corresponding to the tip shape of the projection 120Dd. Due to this feature, pressure applied by the pressing member 120D is surely applied to the pressure sensing semiconductor device 113D.

When pressing force by the pressing member 120D is applied to the pressure-applied part 22Dc of the pressure transmitting member 22D, the pressing projection 22Dc of the pressure transmitting member 22D presses the first electrode 1 of the pressure detecting chip 10 toward the space 5 based on the elasticity of the cushion members 29Da and 29Db. Accordingly, the first electrode 1 of the pressure detecting chip 10 is bent toward the space 5 and the capacitance Cv changes.

In the pressure sensing semiconductor device 113D used for the fifth embodiment, the shape of the pressing projection 22Da of the pressure transmitting member 22D is spherical. Therefore, even when the direction of the pressing force applied via the core body 107D and the pressing member 120D is different from the direction perpendicular to the surface of the first electrode 1 of the pressure detecting chip 10, a contact between the cushion member 29Da and the spherical pressing projection 22Da is ensured to make possible stable abutting of the spherical pressing projection 22Da against the first electrode 1.

In the fifth embodiment shown in FIG. 14 explained above, a spherical shape is employed as the shape of the tip part of the pressure transmitting member to press the first electrode 1 of the pressure detecting chip 10. However, the shape of the tip part of the pressure transmitting member is not limited to the spherical shape and may be, e.g., any projection shape. By forming the tip part of the pressure transmitting member into various protruding shapes including spherical shape and projection shape in this manner, and by selecting a suitable material to form either one or both of, e.g., the tip shape of the pressing projection 22Da of the pressure transmitting member 22D and the cushion members 29Da and 29Db, a desired characteristic can be obtained as the change characteristic of the capacitance Cv of the pressure detecting chip 10 as a function of applied writing pressure. In this case, the tip part of the pressure transmitting member to press the first electrode 1 of the pressure detecting chip 10 is given a non-flat surface shape such as the above-described spherical shape and a shape with a sharpened tip. As such non-flat surface shape, e.g., a pyramid or circular cone shape may be used that makes a point contact with the side of the first electrode 1, or a curved surface shape having a predetermined curvature may be used. Furthermore, the tip part of the pressure transmitting member to press the first electrode 1 of the pressure detecting chip 10 may have such a shape as to make a surface contact, as opposed to a point contact, with the first electrode 1. In addition, the area of such surface contact may non-linearly change in correspondence to the applied pressure.

Sixth Embodiment

FIGS. 15A-15C are diagrams for explaining a configuration example of a position indicator 100E of a sixth embodiment. The position indicator 100E of the sixth embodiment is a modification example of the fifth embodiment. In contrast to the fifth embodiment, which is an example in which the pressure sensing semiconductor device 113D is attached to the end surface 300a of the printed wiring board 300, in the sixth embodiment, a pressure sensing semiconductor device 113E is attached on one surface (board surface) 300b of the printed wiring board 300.

FIG. 15A is a partial sectional view of the position indicator 100E of the sixth embodiment corresponding to the partial sectional view of the position indicator 100D of the fifth embodiment. FIG. 15B is a perspective view of the appearance of the pressure sensing semiconductor device 113E used in the position indicator 100E of the sixth embodiment. FIG. 15C is a sectional view along line K-K in FIG. 15B.

A position indicator main body 110E of the position indicator 100E of the sixth embodiment is composed of a ferrite core 112E that forms the rod-shaped member composed of a magnetic material and has a hollow cylindrical shape, the position indication coil 111 wound around the ferrite core 112E, the pressure sensing semiconductor device 113E, the printed wiring board 300, and a core body 107E similarly to the fifth embodiment. However, in the sixth embodiment, one end of the core body forms the protruding member that protrudes from the pen tip and the other end of the core body forms the pressing member that presses the pressure transmitting member differently from the fifth embodiment.

The printed wiring board 300 is held in a case 101E by trenches 103Ea and 103Eb formed in the inner wall of a second case 103E forming the case 101E. Furthermore, similarly to the above-described embodiment, the position of the printed wiring board 300 is restricted based on the end parts of the trenches 103Ea and 103Eb on the side opposite to the pen tip in the axis direction of the case 101E such that the printed wiring board 300 is locked against writing pressure. In the case of the sixth embodiment, the core body 107E is fitted into the pressure sensing semiconductor device 113E disposed on one surface 300b of the printed wiring board 300 as shown in FIG. 15C. Thus, the trenches 103Ea and 103Eb are formed to hold the printed wiring board 300 at a position shifted from the center line position of the case 101E, so that the core body 107E can be fitted into the pressure sensing semiconductor device 113E disposed on the one surface 300b of the printed wiring board 300.

The pressure sensing semiconductor device 113E is attached on the one surface 300b of the printed wiring board 300. A configuration example of the pressure sensing semiconductor device 113E of this example will be described with reference to FIGS. 15B and 15C.

As shown in FIG. 15C, in the pressure sensing semiconductor device 113E in the sixth embodiment, the pressure detecting chip 10 is sealed in a package 20E, with the first electrode 1 and the second electrode 2 each disposed to extend along a direction perpendicular to a bottom surface 20Eb of the package 20E. A lead terminal 24E connected to the first electrode 1 of the pressure detecting chip 10 is led out from a side surface 20Ec of the package 20E in such a manner as to extend along the direction parallel to the bottom surface 20Eb and be flush with the bottom surface 20Eb. A lead terminal 25E connected to the second electrode 2 is similarly led out from a side surface 20Ed opposite to the side surface 20Ec of the package 20E in such a manner as to extend along the direction parallel to the bottom surface 20Eb and be flush with the bottom surface 20Eb.

In this example, as shown in FIG. 15C, the lead terminals 24E and 25E have bent parts 24Ea and 25Ea bent in the direction perpendicular to the bottom surface 20Eb of the package 20E. In the printed wiring board 300, through-holes 314 and 315, into which the bent parts 24Ea and 25Ea of the lead terminals 24E and 25E are inserted, are formed at the attachment position of the pressure sensing semiconductor device 113E.

The pressure sensing semiconductor device 113E is aligned and disposed on the one surface 300b of the printed wiring board 300 by the insertion of the bent parts 24Ea and 25Ea of the lead terminals 24E and 25E into the through-holes 314 and 315 of the printed wiring board 300. In this state, the lead terminals 24E and 25E are soldered to printed patterns 316 and 317 of the printed wiring board 300. Thereby, the pressure sensing semiconductor device 113E is fixed to the printed wiring board 300.

In a package member 21E of the package 20E that encloses the pressure detecting chip 10, a recessed hole 23E is formed to extend along the direction parallel to the bottom surface 20Eb of the package 20E. The recessed hole 23E communicates to the top surface 1a of the first electrode 1 of the pressure detecting chip 10 in the package member 21E. The opening side of the recessed hole 23E is shaped into a taper part 21Ec flaring in a trumpet shape, and guides the core body 107E as the pressing member to facilitate insertion of the core body 107E.

A film-shaped elastic member forming the pressure transmitting member, specifically a cushion member 22E composed of, e.g., silicone rubber, is provided on the side of the top surface 1a of the first electrode 1 of the pressure detecting chip 10. Projections 23Ea and 23Eb in the form of an O-ring are formed on the inner wall surface of the recessed hole 23E. The inner diameter of the recessed hole 23E is set almost equal to or slightly larger than the diameter of the abutting part of the core body 107E (shown by the dashed line in FIG. 15C). The inner diameter of the projections 23Ea and 23Eb in the form of an O-ring is so selected as to be slightly smaller than the diameter of the abutting part of the core body 107E.

Therefore, the core body 107E can be inserted into the recessed hole 23E and its tip can abut against the top surface 1a of the first electrode 1 of the pressure detecting chip 10 with the intermediary of the cushion member 22E. In this case, as shown in FIG. 15A, an end part 107Ea of the core body 107E on the side opposite to one end side serving as the pen tip penetrates through a hollow part 112Ea of the ferrite core 112E to be inserted into the recessed hole 23E of the pressure sensing semiconductor device 113E.

Therefore, when a writing pressure is applied to the core body 107E, a pressure is transmitted to the cushion member 22E in the direction parallel to a top surface 20Ea and the bottom surface 20Eb of the package 20E by the end part 107Ea of the core body 107E inserted into the recessed hole 23E. Thereby, the first electrode 1 of the pressure detecting chip 10 is bent toward the space 5 and the capacitance Cv of the pressure detecting chip 10 changes in correspondence to the applied writing pressure. That is, the core body 107E as the pressing body presses the cushion member 22E as the pressure transmitting member, whereby the capacitance Cv of the pressure detecting chip 10 changes. The pen tip part protruding from the penetrating hole 104b to the external forms the protruding member.

At this time, according to the pressure sensing semiconductor device 113E of the sixth embodiment, the core body 107E is held by the holder formed by the projections 23Ea and 23Eb in the form of an O-ring based on the insertion of its end part 107Ea into the recessed hole 23E. Furthermore, the pressure corresponding to the writing pressure applied by the core body 107E is surely transmitted to the first electrode 1 of the pressure detecting chip 10 via the cushion member 22E.

The pressure sensing semiconductor device 113E of the above-described example has a configuration in which the cushion member 22E is provided as the pressure transmitting member. However, it is also possible to employ a configuration in which an elastic member, as in the pressure sensing semiconductor device 113 of the example of FIGS. 1A-1D, is disposed in front of the first electrode 1 of the pressure detecting chip 10 within the recessed hole 23E. Besides, it is also possible to employ a configuration in which the package member 21E is formed of a material having elasticity to thereby allow the package member to also function as the pressure transmitting member like the pressure sensing semiconductor device 113A of the second embodiment.

In this example of FIGS. 15A-15C, a desired change characteristic can be obtained for the capacitance Cv of the pressure detecting chip 10 as a function of writing pressure applied by the core body 107E by selecting either one or both of a suitable shape for the tip part of the core body 107E inserted in the recessed hole 23E and a suitable material to form the cushion member 22E.

Moreover, although the example of the explanation of the above-described sixth embodiment is an example in which a hollow cylindrical ferrite core is used, the basic configuration of the sixth embodiment can be similarly employed also when a solid ferrite core like in the above-described first to third embodiments is used. Specifically, the configuration is so made that writing pressure is transmitted to the pressure sensing semiconductor device disposed on the one surface 300b of the printed wiring board 300 by transmitting pressure to the pressure transmitting member by the end part of the solid ferrite core as the pressing member or by using a separate member provided at the end part of the solid ferrite core as the pressing member.

Figure 16A:
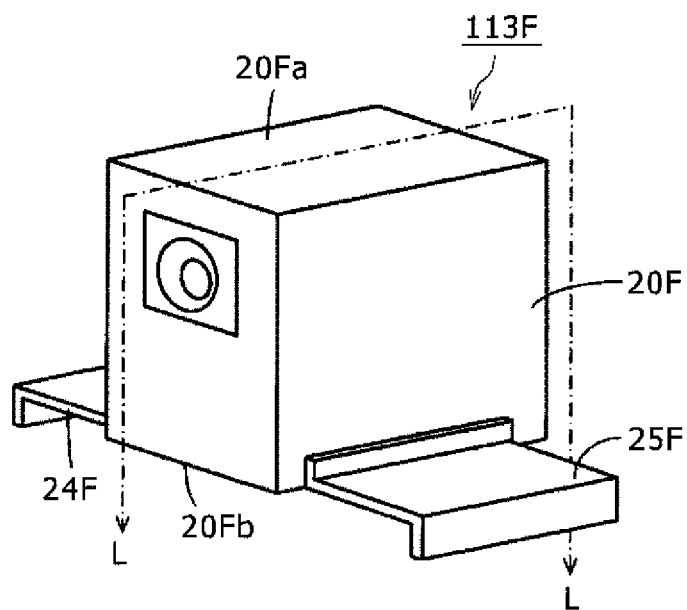
FIGS. 16A and 16B are diagrams for explaining a configuration example of a device including a semiconductor element used for the position indicator of the sixth embodiment according to this invention.
Figure 16B:
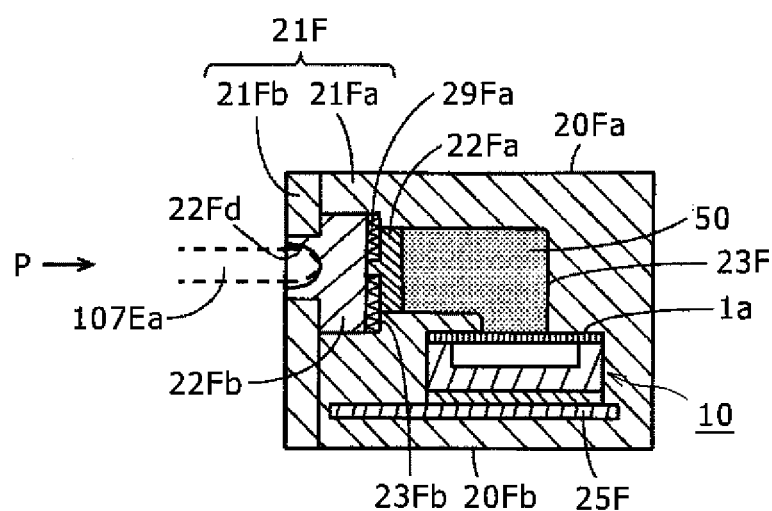

Another Example of Pressure Sensing Semiconductor Device Used in Sixth Embodiment FIGS. 16A and 16B show another configuration example of the pressure sensing semiconductor device used in the position indicator 100E of the sixth embodiment. FIG. 16A is an appearance perspective view of a pressure sensing semiconductor device 113F of this example and FIG. 16B is a sectional view along line L-L in FIG. 16A.

In the pressure sensing semiconductor device 113F of this example, the pressure detecting chip 10 is sealed in a package 20F in the state in which the surface 1a of the first electrode 1 is parallel to a top surface 20Fa and a bottom surface 20Fb of the package 20F. A lead terminal 24F connected to the first electrode 1 of the pressure detecting chip 10 is so led out as to extend along the direction parallel to both the bottom surface 20Fb and the direction in which the writing pressure is applied and be flush with the bottom surface 20Fb. A lead terminal 25F connected to the second electrode 2 is also so led out as to extend along the direction parallel to both the bottom surface 20Fb and the direction in which the writing pressure is applied and be flush with the bottom surface 20Fb.

As shown in FIGS. 16A and 16B, in the pressure sensing semiconductor device 113F of this example, a package member 21F forming the package 20F is composed of a main part 21Fa and a lid part 21Fb, and a recess 23F having a shape bending in a key shape above the first electrode 1 of the pressure detecting chip 10 is formed inside the package member 21F.

A fluid (or fluent body) 50 is packed in the recess 23F and the recess 23F is sealed by a sealing valve 22Fa to prevent leakage of the fluid 50. However, the sealing valve 22Fa is configured to be displaced (movable), as described later.

In this example, a valve pressing part 22Fb presses the sealing valve 22Fa via a cushion member 29Fa, which is formed of a film-shaped elastic member and which is engaged with a step part 23Fb made in the main part 21Fa of the package member 21F, in such a direction as to compress the fluid 50. The valve pressing part 22Fb has a recess 22Fd that receives the tip of the core body 107E, which applies the writing pressure P in the lateral direction shown by the arrow in FIG. 16B.

The pressure sensing semiconductor device 113F of this example has the above-described structure. Therefore, when the valve pressing part 22Fb receives the pressing force (writing pressure) P in the direction shown by the arrow in FIG. 16B, the valve pressing part 22Fb is displaced in the application direction of the pressing force P due to the cushion member 29Fa. In response to this, the sealing valve 22Fa is also displaced in such a direction as to compress the fluid 50.

Thereupon, the pressing force P transmitted to the fluid 50 is transmitted to the first electrode 1 of the pressure detecting chip 10 and the first electrode 1 of the pressure detecting chip 10 bends in correspondence to the pressing force P. Accordingly, the capacitance Cv of the pressure detecting chip 10 changes.

From the above, in the pressure sensing semiconductor device 113F of this example, the pressure transmitting member is configured by the fluid 50, the sealing valve 22Fa, the valve pressing part 22Fb, and the cushion member 29Fa.

In this case, in this example, with respect to the cross-section area of the key-shaped recess 23F, a cross-section area Sb on the first electrode 1 of the pressure detecting chip 10 is made smaller than a cross-section area Sa near the sealing valve 22Fa. Therefore, the pressure applied to the side of the sealing valve 22Fa is transmitted as a large force onto the first electrode 1 of the pressure detecting chip 10. This allows the pressing force P to be transmitted to the first electrode 1 of the pressure detecting chip 10 with high efficiency.

In the pressure sensing semiconductor device 113F of this example, the material of the cushion member 29Fa and the material of the fluid 50 are so selected that a desired change characteristic is obtained for the capacitance Cv of the pressure detecting chip 10 as a function of the pressing force P. As the fluid 50, either a liquid or a gas may be used. In short, any material may be used as long as it can transmit the applied pressure P.

Seventh Embodiment

FIGS. 17A-17D are diagrams for explaining a configuration example of a position indicator 100G of a seventh embodiment. FIG. 17A is a partial sectional view of the position indicator 100G of the seventh embodiment corresponding to the partial sectional view of the position indicator 100E of the sixth embodiment. FIG. 17B is a sectional view along line M-M in FIG. 17A. FIG. 17C is a diagram for explaining parts that form a portion of the seventh embodiment. FIG. 17D is a diagram used for explaining the operation of the seventh embodiment.

In the position indicator 100G of the seventh embodiment, a pressure sensing semiconductor device 113G is formed on one surface 300b of the printed wiring board 300 similarly to the sixth embodiment. The pressure sensing semiconductor device 113G has a configuration similar to that of the pressure sensing semiconductor device 113E of the position indicator 100E of the sixth embodiment and is fixedly attached to the one surface 300b of the printed wiring board 300 similarly to the above-described sixth embodiment.

In the seventh embodiment, a ferrite core is not used and the position indication coil 111 is wound around a core body 150 composed of, e.g., resin differently from the sixth embodiment. In this case, the core body 150 is composed of a pen tip 151 as the protruding member and a columnar body 152 as the rod-shaped member. The pen tip 151 is fitted into the columnar body 152 and the position indication coil 111 as the inductance element is wound around the columnar body 152.

At the center part of the end surface of the columnar body 152 on the side of the pen tip 151, a recess 152a is formed into which the pen tip 151 is fitted. On the side opposite to the side of the pen tip 151 of the columnar body 152 in the axis direction, a protruding member 152b is formed as the pressing member that is inserted in a recessed hole 23G of the pressure sensing semiconductor device 113G to press the pressure transmitting member. Furthermore, a film-shaped elastic member forming the pressure transmitting member, specifically a cushion member 22G composed of, e.g., silicone rubber, is provided on the side of the top surface 1a of the first electrode 1 of the pressure detecting chip 10, as already described.

Therefore, in the seventh embodiment, when a writing pressure is applied to the pen tip 151 as the protruding member, the pressing force corresponding to the writing pressure is transmitted to the first electrode 1 of the pressure detecting chip 10 of the pressure sensing semiconductor device 113G, via the cushion member 22G as the pressure transmitting member, by the protruding member 152b of the columnar body 152 as the pressing member. Accordingly, the capacitance Cv of the pressure detecting chip 10 changes.

Moreover, the seventh embodiment is so configured that the writing pressure applied along a direction intersecting the axial core direction of the core body 150 can also be detected. Specifically, as shown in FIG. 17B, three pressure sensing semiconductor devices 161, 162, and 163 are provided to face the circumferential surface of the columnar body 152 near the pen tip 151.

Although not shown in the diagram, each of these three pressure sensing semiconductor devices 161, 162, and 163 is formed as, e.g., the thin shape device similar to the pressure detecting chip 10 described above including the first and second electrodes 1 and 2 sandwiching a dielectric layer 3 therebetween, and further including the cushion member 22G as the pressure transmitting member disposed on the first electrode 1. As shown in FIG. 17C, the pressure sensing semiconductor devices 161, 162, and 163 are each sealed in a package in the state in which the cushion member is exposed to the external through an opening surface 161a, 162a, or 163a formed in the package. Furthermore, as also shown in FIG. 17C, these three pressure sensing semiconductor devices 161, 162, and 163 are attached to a horizontal line part 164a of a T-shaped flexible substrate 164 at predetermined intervals.

The printed wiring board 300 is held in a case 101G by trenches 103Ga and 103Gb defined in the inner wall of a second case 103G forming the case 101G. Furthermore, similarly to the above-described embodiment, the position of the printed wiring board 300 is so restricted that the printed wiring board 300 is locked against writing pressure by the end parts of the trenches 103Ga and 103Gb on the side opposite to the pen tip in the axis direction of the case 101G. The length of the horizontal line part 164a corresponds to the inner diameter of the first case 102G of the case 101G of the position indicator 100G. Furthermore, the horizontal line part 164a is provided on the side of the pen tip 151 of the first case 102G in such a manner as to be wound around the columnar part 152, with each of the pressure sensing semiconductor devices 161, 162, and 163 facing the circumferential surface of the columnar part 152. At this time, the horizontal line part 164a of the flexible substrate is bonded and fixed to the inner wall surface of the first case 102G. As a result, in this example, three pressure sensing semiconductor devices 161, 162, and 163 are disposed to face the circumferential surface of the columnar part 152 at an angular interval of 120 degrees as shown in FIG. 17B.

In addition, as shown in FIGS. 17A and 17B, pressing projections 153a, 153b, and 153c are formed on the circumferential surface of the columnar part 152 at the portions corresponding to the respective opening surfaces 161a, 162a, or 163a of the pressure sensing semiconductor devices 161, 162, and 163, respectively.

Each of the first electrodes and the second electrodes of the three pressure sensing semiconductor devices 161, 162, and 163 attached to the horizontal line part 164a of the flexible substrate 164 is connected to a respective one of lead wiring patterns formed on the flexible substrate 164. Furthermore, the lead wiring patterns are formed across a vertical line part 164b of the flexible substrate 164 although not fully shown in the diagram.

The length of the vertical line part 164b of the flexible substrate 164 is set such that each of the first electrodes and the second electrodes of the three pressure sensing semiconductor devices 161, 162, and 163 on the horizontal line part 164a that is bonded to the inner wall of the first case 102G can be electrically connected to a printed pattern on the printed wiring board 300. The end part of the vertical line part 164b of the flexible substrate 164 is connected to the IC 305 via the printed patterns on the printed wiring board 300.

Because the configuration is made in the above-described manner, as shown in FIG. 17D, when a writing pressure is applied to the pen tip 151 while the position indicator 100G is inclined or tilted relative to the writing surface, a writing pressure Ps along a direction intersecting the axis direction is applied to the pen tip 151. In this case, the columnar part 152 of the core body 150 receives force component PsX in a direction intersecting the axis direction, with the engagement portion between the core body 150 and the pressure sensing semiconductor device 113G serving as a fulcrum. Thus, the columnar part 152 is slightly displaced in this direction intersecting the axis direction. The pressure associated with such displacement is applied to each of the three pressure sensing semiconductor devices 161, 162, and 163 based on the respective projections 153a, 153b, and 153c pressing against the opening surfaces 161a, 162a, and 163a formed in the respective packages. Therefore, the capacitance Cv of each of the pressure detecting chips 10 forming the three pressure sensing semiconductor devices 161, 162, and 163 exhibits a value corresponding to the received pressure.

In this embodiment, the capacitance Cv of the pressure detecting chip 10 forming each of the these three pressure sensing semiconductor devices 161, 162, and 163 is detected by the IC 305. Furthermore, the IC 305 also detects the capacitance Cv corresponding to the writing pressure applied along the axis direction, which is determined in the pressure sensing semiconductor device 113G, as already described.

The IC 305 can obtain the magnitude of the writing pressure and any side force to the position indicator 100G based on the detected capacitance of the pressure sensing semiconductor device 113G and the detected capacitance of the three pressure sensing semiconductor devices 161, 162, and 163. Furthermore, the capacitance Cv of the pressure detecting chip 10 forming each of the three pressure sensing semiconductor devices 161, 162, and 163 exhibits a value corresponding to the pressure received by a respective one of the three devices. Thus, the IC 305 can detect the application direction of the writing pressure Ps along a direction intersecting the axis direction based on the values of the capacitance Cv of the three pressure detecting chips 10 forming the three pressure sensing semiconductor devices 161, 162, and 163.

In this embodiment, as explained in reference to the above-described FIG. 11, the IC 305 transmits to a position detecting device the detected magnitude of the writing pressure and additionally the detected application direction of the writing pressure as a digital signal.

In the above-described manner, according to the seventh embodiment, when a writing pressure is applied in a direction intersecting the axis direction, such writing pressure can be detected including the application direction thereof.

Although the core body 150 is formed by resin in the above-described seventh embodiment, a solid magnetic body (ferrite core) can be used similarly to the above-described embodiment. In this case, it is obvious that both axial ends of the ferrite core are configured by resin similarly to the third embodiment shown in FIGS. 10A-10C.

The number of pressure sensing semiconductor devices provided on the flexible substrate 164 is not limited to three and may be one or two or may be four or more. Furthermore, in the above-described embodiment, besides the pressure sensing semiconductor devices 161, 162, and 163 that detect pressure applied from a direction intersecting the axis direction, the pressure sensing semiconductor device 113G that directly detects pressure applied along the axis direction of the case is provided. However, the pressure sensing semiconductor device that directly detects pressure applied along the axis direction of the case does not need to be provided. In this case, it is obvious that the end part of the core body on the side opposite to the pen tip may be fixed in the case by any suitable measure.

OTHER EMBODIMENTS OR MODIFICATION EXAMPLES

The position indicators of the above-described respective embodiments are explained as suited to form a position indicator for the position detecting device incorporated in the cell-phone terminal shown in FIG. 2. However, it is obvious that the position indicator according to this invention may be used as a position indicator for the position detecting device incorporated in various kinds of electronic apparatus.

Figure 18:
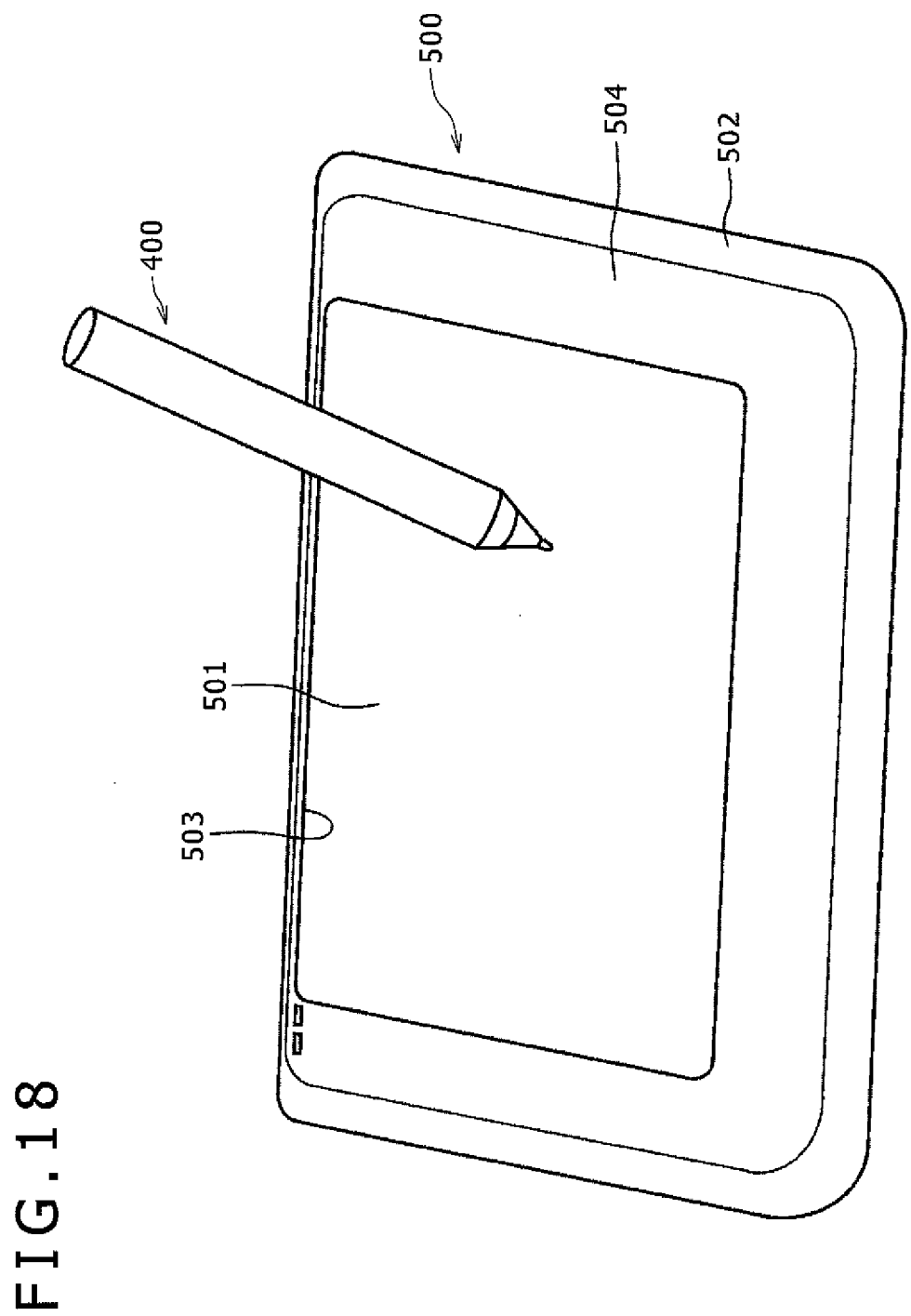
FIG. 18 is a diagram showing an example of an embodiment of the position indicator according to this invention and an electronic apparatus including a position detecting device used together with this position indicator.

For example, FIG. 18 is a diagram showing a position detecting device 500 that is a so-called tablet device and a position indicator 400 used with the position detecting device 500. The position detecting device 500 is connected to external electronic apparatus (not shown) such as a personal computer and other portable apparatus wirelessly or via a cable so as to function as an input device for the electronic apparatus. It is also possible that the position detecting device 500 is configured as a device including a display section such that the device can be operated without being connected to an external electronic apparatus. The position indicator according to various embodiments of this invention can be applied to the position indicator 400 for the position detecting device 500.

The position detecting device 500 of this example is composed of a detecting section 501 that detects a position indicated by the position indicator 400 based on the electromagnetic induction system, and a housing 502 formed in a hollow thin substantially rectangular parallelepiped shape to include the detecting section 501. The housing 502 has an upper housing 504 having an opening part 503 to expose the detection surface of the detecting section 501 therethrough and a lower housing (not shown) superimposed on the upper housing 504. The upper housing 504 has the rectangular opening part 503 through which the input surface of the detecting section 501 is exposed, and the detecting section 501 is fitted to this opening part 503.

With the position detecting device 500 having such a configuration, input of characters, figures, and so forth based on pointing operation by the position indicator 400 is performed. When the position detecting device 500 includes a display section, a display corresponding to the pointing operation by the position indicator 400 can be shown on the display section. Furthermore, the position detecting device 500 can adjust the display depending on the writing pressure, e.g., by changing the thickness of characters based on the writing pressure detected from information received from the position indicator 400 by electromagnetic induction.

In the pressure detecting chip 10 of the pressure sensing semiconductor devices of the above-described embodiments, the space 5 is formed as a circular space by the circular recess 4. However, it is obvious that the shape of the space is not limited to a circular shape.

In the above-described examples, the pressure detecting chip 10 has a configuration formed only of the capacitance-variable capacitor. However, the pressure detecting chip 10 may have a configuration including an additional capacitor formed by a semiconductor process, which is connected in series or in parallel to the capacitance-variable capacitor. Furthermore, the pressure detecting chip 10 may have a configuration including a signal processing circuit formed by a semiconductor process on the same semiconductor chip, wherein the signal processing circuit is connected either to the capacitance-variable capacitor alone or to a combination of an additional capacitor connected in series or parallel to the capacitance-variable capacitor.

In the above-described embodiments, the protruding member serving as the pen tip is covered by the preference adjusting member. However, the protruding member itself may be formed as the preference adjusting member.

Furthermore, as shown in FIG. 5, the circuit may be configured in which the pressure detecting chip 10 as the capacitance-variable element forms a resonant circuit together with the inductance element. Alternatively, as shown in FIG. 11, the circuit may be configured in which a control signal generated by the pressure detecting chip 10 based on a pressure detected as a change in capacitance controls a resonant circuit, which is provided separately from the pressure detecting chip 10 and is composed of the inductance element and a capacitance element. In addition, various configurations of the position indicator (100, 100A, 1006, 100C, 100D, 100E, 100G) are described above in association with the respective circuit configurations. However, it is obvious that, regardless of the differences in the circuit configuration, various components of the position indicators may be replaced or exchanged amongst the position indicators, and a combination or arrangement relationship of the components in each position indicator may be adjusted from a functional point of view according to need.

DESCRIPTION OF REFERENCE SYMBOLS

10 . . . Pressure detecting chip,
100, 100A to 100G . . . Position indicator,
101, 100A to 100G . . . Case,
104 . . . Pen tip sleeve,
105 . . . Preference adjusting member,
111 . . . Position indication coil,
112 . . . Ferrite core,
113, 113A to 113G . . . Pressure sensing semiconductor device,
114, 115 . . . Terminal plate,
300 . . . Printed wiring board

The invention claimed is:

1. A pen-shaped position indicator comprising:
an elongated housing having a distal end and a proximal end;
a rod partially housed in the housing and partially extending from the distal end of the housing to serve as a pen tip;
an axial-pressure sensor configured to detect a pressure applied to the rod along an axial direction of the rod; and
one or more side-pressure sensors interposed between an exterior surface of the rod and an interior surface of the housing and configured to detect a pressure applied to the rod along a side direction different from the axial direction of the rod, wherein
the axial-pressure sensor and the one or more side-pressure sensors are configured to be pressed by a pressure from the rod, said pressure being applied in a direction different from both the axial direction and the side direction of the rod, and the axial-pressure sensor detects an axial-direction component of said pressure and the one or more side-pressure sensors detect a side-direction component of said pressure.

2. The pen-shaped position indicator of claim 1, wherein the side direction is perpendicular to the axial direction of the rod.

3. The pen-shaped position indicator of claim 1, wherein the one or more side-pressure sensors are attached to the exterior surface of the rod.

4. The pen-shaped position indicator of claim 1, wherein the one or more side-pressure sensors are attached to the interior surface of the housing.

5. The pen-shaped position indicator of claim 1, wherein the axial-pressure sensor is disposed proximal to a proximal end of the rod.

6. The pen-shaped position indicator of claim 1, wherein the one or more side-pressure sensors are disposed between a tip end and a proximal end of the rod along the axial direction of the rod.

7. The pen-shaped position indicator of claim 1, wherein at least one of the axial-pressure sensor and the one or more side-pressure sensors is a MEMS semiconductor device.

8. The pen-shaped position indicator of claim 1, wherein the one or more side-pressure sensors are configured to be pressed by the rod to thereby detect the pressure applied to the rod along the side direction.

9. The pen-shaped position indicator of claim 1, wherein the rod includes a magnetic core on which a coil is wound.

10. The pen-shaped position indicator of claim 1, wherein a distal portion of the rod extending from the distal end of the housing is made of a material different from that of a proximal portion of the rod housed in the housing.

11. The pen-shaped position indicator of claim 10, wherein the distal portion of the rod is removable from the proximal portion of the rod.

12. The pen-shaped position indicator of claim 1, wherein a distal portion of the rod extending from the distal end of the housing is made of the same material as that of a proximal portion of the rod housed in the housing.

13. The pen-shaped position indicator of claim 1, which includes a plurality of the side-pressure sensors.

14. The pen-shaped position indicator of claim 13, wherein the plurality of the side-pressure sensors are equidistantly arranged along a circumference of the rod.

15. The pen-shaped position indicator of claim 13, wherein the plurality of the side-pressure sensors are arranged on a flexible sheet, which is wound along a circumference of the rod.

16. A method of sensing a pressure applied to a pen-shaped position indicator, comprising:
    using an axial pressure sensor, detecting an axial-pressure applied to a rod, which is partially housed in an elongated housing of the pen-shaped position indicator and partially extending from a distal end of the housing, wherein the axial-pressure is applied along an axial direction of the rod;
    using one or more side-pressure sensors, detecting a side-pressure applied to the rod along a side direction different from the axial direction of the rod;
    using the axial pressure sensor, detecting an axial-direction component of a pressure applied in a direction different from both the axial direction and the side direction of the rod; and
    using the one or more side-pressure sensors, detecting a side-direction component of said pressure applied in the direction different from both the axial direction and the side direction of the rod.

17. The method of claim 16, wherein the side direction is perpendicular to the axial direction of the rod.

* * * * *